United States Patent
Chmielewski et al.

(10) Patent No.: US 7,546,271 B1
(45) Date of Patent: Jun. 9, 2009

(54) MORTGAGE FRAUD DETECTION SYSTEMS AND METHODS

(75) Inventors: Thomas Chmielewski, Alpharetta, GA (US); Denise James, Wellington, FL (US)

(73) Assignee: Choicepoint Asset Company, Alpharetta, GA (US)

( * ) Notice: Subject to any disclaimer, the term of this patent is extended or adjusted under 35 U.S.C. 154(b) by 0 days.

(21) Appl. No.: 12/174,591

(22) Filed: Jul. 16, 2008

Related U.S. Application Data

(60) Provisional application No. 61/015,429, filed on Dec. 20, 2007.

(51) Int. Cl.
  *G06Q 40/00* (2006.01)
(52) U.S. Cl. .......................................... 705/38; 705/35
(58) Field of Classification Search .................... 705/1, 705/35, 38, 40, 4
  See application file for complete search history.

(56) References Cited

U.S. PATENT DOCUMENTS

| | | | |
|---|---|---|---|
| 6,029,154 | A | 2/2000 | Pettit |
| 6,581,039 | B2 * | 6/2003 | Marpe et al. ................... 705/7 |
| 6,715,672 | B1 | 4/2004 | Tetro et al. |
| 6,766,322 | B1 | 7/2004 | Bell |
| 7,311,248 | B1 | 12/2007 | Halvorson et al. |
| 7,458,508 | B1 | 2/2008 | Shao et al. |
| 7,373,669 | B2 | 5/2008 | Eisen |
| 7,427,016 | B2 | 9/2008 | Chimento |
| 7,472,089 | B2 | 12/2008 | Hu et al. |
| 2002/0133371 | A1 * | 9/2002 | Cole .............................. 705/1 |
| 2003/0009418 | A1 | 1/2003 | Green et al. |
| 2003/0036996 | A1 | 2/2003 | Lazerson |
| 2003/0093365 | A1 | 5/2003 | Halper et al. |
| 2003/0093366 | A1 * | 5/2003 | Halper et al. ................. 705/38 |
| 2003/0097342 | A1 | 5/2003 | Whittington |

(Continued)

FOREIGN PATENT DOCUMENTS

| | | |
|---|---|---|
| WO | WO2006105576 | 10/2006 |

OTHER PUBLICATIONS

"2007 Risk Metrics Validation Study;" Interthinx, an ISO Company; 2007; pp. 1-5.

(Continued)

*Primary Examiner*—James P Trammell
*Assistant Examiner*—Jamie H Swartz
(74) *Attorney, Agent, or Firm*—Troutman Sanders LLP; Ryan A. Schneider; James Hunt Yancey, Jr.

(57) ABSTRACT

Mortgage fraud detection systems and methods are provided. A fraud detection system can generally comprise a database operator, a database manager, one or more users, and a database. Database components can be implemented as hardware, software, or a combination of both. A fraud detection method can generally comprise providing a database for maintaining a plurality of records. Data records can be continually received by a database in batchwise or single submission protocols. Records can be compared to determine whether they contain common data in one or more predetermined fields. If records contain common data in one or more predetermined fields, records can be examined for inconsistencies in one or more other data fields. Discovered inconsistencies and magnitudes of inconsistencies can be warning signs of fraud. Results of comparisons can be reported to system users to enable such users to investigate additional circumstances. Other embodiments and features are also claimed and described in the application.

19 Claims, 11 Drawing Sheets

U.S. PATENT DOCUMENTS

| | | |
|---|---|---|
| 2003/0182151 A1 | 9/2003 | Taslitz |
| 2003/0187783 A1 | 10/2003 | Arthus et al. |
| 2004/0030649 A1 | 2/2004 | Nelson et al. |
| 2004/0064401 A1 | 4/2004 | Palaghita et al. |
| 2004/0138912 A1 | 7/2004 | Campbell |
| 2005/0108025 A1 | 5/2005 | Cagan |
| 2005/0154665 A1 | 7/2005 | Kerr |
| 2005/0187863 A1 | 8/2005 | Whinery |
| 2005/0203830 A1 | 9/2005 | Prieston |
| 2006/0136330 A1 | 6/2006 | DeRoy et al. |
| 2006/0218079 A1* | 9/2006 | Goldblatt et al. ............... 705/38 |
| 2006/0224499 A1 | 10/2006 | Graboske |
| 2007/0016522 A1 | 1/2007 | Wang |
| 2007/0067234 A1 | 3/2007 | Beech |
| 2007/0174214 A1* | 7/2007 | Welsh et al. ................. 705/405 |
| 2007/0192240 A1 | 8/2007 | Crooks |
| 2007/0208641 A1 | 9/2007 | Smith et al. |
| 2007/0219819 A1* | 9/2007 | Campbell et al. ............... 705/1 |
| 2007/0226129 A1 | 9/2007 | Liao |
| 2008/0021801 A1* | 1/2008 | Song et al. .................... 705/35 |
| 2008/0109349 A1 | 5/2008 | Jenich et al. |
| 2008/0147454 A1 | 6/2008 | Walker et al. |
| 2008/0167883 A1 | 10/2008 | Khazaneh |

OTHER PUBLICATIONS

Mortgage Fraud & Organized Crime in Canada, Criminal Intelligence Service Canada—Central Bureau, Nov. 2007, Retrieved from Internet: http://www.cisc.gc.ca/products_services/mortgage_fraud/document/mortgage_e.pdf.

"Improving Fraud Risk Assessments through Analytical Procedures" by Keith Jones, Department of Accounting, George Mason University, Sep. 2004, Retrieved from Internet: http://marriottschool.byu.edu/conferences/accountingsymposium/papers/Jones2004.pdf.

Discovering Golden Nuggets: Data Mining in Financial Application, Dongson Zhang and Lina Zhou, IEEE Transactions on Systems, Man and Cybernatics-Part C: Application and Reviews, vol. 34, No. 4, Nov. 2004.

Multiple Algorithms for Fraud Detection, R. Wheeler, S. Aitken, Knowledge Based Systems 13 (2000) 93-99.

* cited by examiner

| Customer Name: | New Century | | | | | | | Batch ID #<br>Date Submitted |

──── 670
── 610

| Loan ID | Property Address | Loan ID | Loan ID | Loan ID | Loan ID | Loan ID |
|---|---|---|---|---|---|---|
| #12345 | 123 Main Street, Crimesville, US | #12345 | Other | Other | | |
| | LOAN AMOUNT | $145,000 | $160,000 | $130,000 | | |
| | APPLICATION DATE | 5/12/2007 | 6/12/2007 | 4/12/2007 | | |

620  630  640  650  650

Possible Fraud Scenario : CHURNING ──── 660

| Customer Name: | New Century | | | | | Batch ID #<br>Date Submitted |

──── 670
610

| Loan ID | Property Address | Loan ID | Loan ID | Loan ID | Loan ID |
|---|---|---|---|---|---|
| #12345 | 123 Main Street, Crimesville, CT | #12345 | Other | Other | Other |
| | APPLICATION DATE | 5/13/2007 | 5/13/2007 | | 5/11/2007 |
| | ORIGINATOR NAME | William Smith | Steve Smith | Jeff George | Tom Thomas |
| | ORIGINATOR LICENSE | 198746 | 8975246 | 292326 | 9847528 |
| | ORIGINATOR ADDRESS | 47 Peach St | 32 Main St | 18 10th St | West Main St |
| | ORIGINATOR ADDRESS | Middletown CT | Center CT | Hart CT | Essex CT |
| | APPRAISER NAME | J John | A Adam | C Curry | D Smith |
| | APPRAISER COMPANY | ABC Appraiser | All Appraise | Appraise | CT Appraisors |
| | APPRAISER LICENSE | s978987 | w98798789 | q989798 | b9889797 |
| | REALTOR NAME | T Tom | Jeff Jeffery | S Smith | J Johnston |
| | REALTOR LICENSE | 343-891987 | 233-39977 | 584-23432 | 788-42323 |
| | REALTOR COMPANY | Prudential | Holmes | Century 21 | Remax |

620  630  640  650  650  650

Possible Fraud Scenario : SHOTGUNNING ──── 660

| Customer Name: | New Century | | | Batch ID # Date Submitted |

| Loan ID | Property Address | Loan ID | Loan ID |
|---|---|---|---|
| #12345 | 123 Main Street, Crimesville, CT | #12345 | Other |
| | APPLICATION DATE | 3-12-2007 | 4-11-2007 |
| | LOAN AMOUNT | $250,000 | $55,000 |
| | ORIGINATOR NAME | William Smith | Steve Smith |
| | ORIGINATOR LICENSE | 198746 | 8973246 |
| | ORIGINATOR ADDRESS | 47 Peach St | 32 Main St |
| | ORIGINATOR ADDRESS | Middletown CT | Center CT |
| | APPRAISER NAME | J John | A Adam |
| | APPRAISER COMPANY | ABC Appraiser | AB Appraise |
| | APPRAISER LICENSE | s978987 | w98798789 |
| | REALTOR NAME | T Tom | N/A |
| | REALTOR LICENSE | 342-897987 | N/A |
| | REALTOR COMPANY | Prudential | N/A |

Possible Fraud Scenario: SILENT SECOND — 660

| Customer Name: | New Century | | | | | | | Batch ID # Date Submitted |

| Loan ID | Property Address | Loan ID | Loan ID | Loan ID | Loan ID | Loan ID | Loan ID |
|---|---|---|---|---|---|---|---|
| #12345 | 123 Main Street, Crimesville, US | #12345 | #24976 | #48800 | Other | Other | Other |
| | Appraisal Value | $150,000 | $100,000 | $200,000 | $300,000 | $500,000 | $400,000 |
| | Appraiser Name | V. Greedy | | Lori Bad | Rip Off | S Apprais | D Karens |
| | Appraiser License | 24918 | | 19483 | 23496 | 468979 | 239874 |
| | Appraiser Company | Global | | Steal LLC | ABC | App Inc. | Karens Appraisers |
| | Loan Amount | $130,000 | $90,000 | $180,000 | $280,000 | $450,000 | $370,000 |

Possible Scenario(s): Flipping Shotgunning

APPRAISER NOT CREDENTIALED — V. Greedy — Lori Bad — Rip Off — S. Apprais
BROKER NOT CREDENTIALED — S SMITH

FIG. 6E

| Customer Name: | New Century | | | Batch ID # |
|---|---|---|---|---|

610 — 670

| Loan ID | Property Address | Loan ID | Loan ID |
|---|---|---|---|
| #12345 | 123 Main Street, Crimesville, CT | #12345 | #23456 |
| LOAN AMOUNT | | $180,000 | $200,000 |
| BORROWER LAST NAME | | Doe | Smith |
| BORROWER FIRST NAME | | John | David |
| APPRAISER NAME | | J John | A Adam |
| APPRAISER COMPANY | | ABC Appraiser | All Appraise |
| APPRAISER LICENSE | | s978987 | w98798789 |
| REALTOR NAME | | T Tom | N/A |
| REALTOR LICENSE | | 342-897987 | N/A |
| REALTOR COMPANY | | Prudential | N/A |

620 → (Loan ID column), 630 → (Property Address), 640 → (middle Loan ID), 650 → (right Loan ID)

Possible Fraud Scenario: DOUBLE ESCROW — 660

FIG. 6F

| Customer Name: | New Century | | | | Batch ID # |
|---|---|---|---|---|---|
| | | | | | Date Submitted |

610 — 670

| Loan ID | NAME | Loan ID | Loan ID | | |
|---|---|---|---|---|---|
| #12345 | John Q. Public | #12345 | Other | Other | Other |
| SUBJECT PROPERTY STREET | | 123 Main Street | 57 Peach St | 19 Olive St | 37-b Beacon St |
| SUBJECT PROPERTY CITY | | Middletown | | Easttown | Westtown |
| SUBJECT PROPERTY STATE | | CT | | MA | RI |
| SUBJECT PROPERTY ZIP | | 16476 | 16476 | 18864 | 32667 |
| SUBJECT PROPERTY PLAT | | 1-2-54-87 | 3-574-234-11 | GZ54-8-3-5-4 | 19-2-5-466-43B |
| APPLICATION DATE | | 5/12/2007 | 5/13/2007 | | 5/11/2007 |
| ORIGINATOR NAME | | William Smith | Steve Smith | Jeff George | Tom Thomas |
| ORIGINATOR LICENSE | | 198746 | 8973246 | 292326 | 9847528 |
| ORIGINATOR ADDRESS | | 47 Peach St | 32 Main St | 18 19th St | West Main St |
| ORIGINATOR ADDRESS | | Middletown CT | Center CT | Boston MA | Westerly RI |
| APPRAISER NAME | | J John | A Adam | C Curry | D Smith |
| APPRAISER COMPANY | | ABC Appraiser | All Appraise | Appraise | CT Appraisers |
| APPRAISER LICENSE | | s978987 | w98798789 | q989798 | b989797 |
| REALTOR NAME | | T Tom | Jeff Jeffery | S Smith | J Johnston |
| REALTOR LICENSE | | 342-897987 | 233-89877 | 584-23432 | 789-82323 |
| REALTOR COMPANY | | Prudential | Holmes | Century 21 | Remax |
| PURCHASE TYPE | | | | | |

Possible Fraud Scenario: CHUNKING — 660

MORTGAGE FRAUD DETECTION SYSTEMS AND METHODS

CROSS-REFERENCE TO RELATED APPLICATION & PRIORITY CLAIM

This application claims priority to and the benefit of U.S. Provisional Patent Application No. 61/015,429, filed 20 Dec. 2007, which is incorporated herein by reference in its entirety as if fully set forth below.

TECHNICAL FIELD

The various embodiments of the present invention relate generally to database and information management systems and, more particularly, to fraud detection database systems and methods to assist users to detect mortgage fraud as well as other types of financial fraud that may occur in a financial application process.

BACKGROUND

As shown increasingly by recent financial events, the mortgage industry continues to struggle with detecting and managing fraud. Lenders have come under scrutiny due to relaxed lending policies and vulnerable lending processes exposed to fraudsters. As a result, lenders are greatly concerned with the continued rise in mortgage fraud. Recent regulatory and political activities have added a new twist to operational concern—compliance risk. More than 70% of loan originations were facilitated by mortgage brokers in 2005 and 2006. Fraud committed by industry insiders has caused reported financial losses in excess of $1 billion to date. This figure alone illustrates that current fraud detection solutions are minimally impacting risk exposure for mortgage industry participants.

Currently, financial industry participants employ a number of systems that aim to detect fraud risks in an effort to prevent and mitigate fraud. Unfortunately, conventional systems, such as information verification tools, have yet to adequately and completely address the various types of mortgage fraudulent events. For example, conventional tools can be used in an attempt to verify information such as property values, names, social security numbers ("SSNs"), assets, and credit history provided during an application process. Despite the existence of existing, conventional automated tools, however, the mortgage industry and other financial industries continue to encounter a significant number of fraud occurrences.

Mortgage fraud typically occurs in two ways: fraud for profit and fraud for housing or property. Fraud for profit schemes typically result in ill-gotten gains from falsified or fraudulent loan transactions and usually involve industry insiders well versed in the funding process. The insiders that are typically parties to fraudulent schemes make it challenging to uncover fraudulent activities. Financial losses stemming from this type of fraudulent activity can be significant and devastating to industry participants. Examples of insider contributed fraud include, but are not limited to, illegal flipping, straw buyer scams, equity skimming, and fraudulent property investments.

Fraud for housing or property generally involves factual misstatements to obtain a property as a primary residence. This type of fraud contributes to the greatest amount of reported fraud. Common misstatements include embellishing salary or income amounts and undisclosed borrowed funds or employment terms. Borrowers are often coached by insiders so that reported data is represented more favorably and appears less risky to lenders.

In addition to the above mentioned mortgage-related fraud schemes, other common schemes are typically perpetuated by those participating in such illegal activities. For example, common mortgage application fraud plots include equity skimming/foreclosure bailout schemes, churning, chunking, shot-gunning, silent second, property flipping, double escrow, straw-buying, air loans, identification theft, asset rentals, mortgage elimination schemes, cash-back schemes, and non-arm's length transactions. These schemes are described below in more detail.

Equity Skimming/Foreclosure Bailout Schemes: Using money for reasons other than paying off loans. For example, when a borrower's property is in foreclosure, a seller purchases the property for a fee and promises to let the borrower continue to live on the property if the borrower deeds the property to the seller. The seller never pays the mortgage, the loan defaults, and the borrower is forced off the property. The seller walks away with a fee or with equity. The seller can then choose to re-mortgage or to abandon the property.

Churning: Refinancing the same property repeatedly in a short period of time. Interest rates, fees, and costs increase with each refinance. The loan officer can make a lot of money on one property because of the loan commissions associated with the constant refinancing. In contrast, lenders and borrowers pay more for the property than they otherwise would.

Chunking: A borrower purchasing multiple properties in a span of a few days. The concurrent debts do not appear on the borrower's credit report before the closings. This scheme is often perpetrated through seminars, or by approaching susceptible groups, such as those in nursing homes or churches. For example, a solicitor offers to sell a potential borrower multiple properties at once, for a fee. The solicitor promises to upkeep the properties, to lease the properties, and to make all payments on the applicable loans. After closing, however, the solicitor disappears with the fees. The borrower is left with mortgages on multiple properties, and the borrower's credit history may be destroyed.

Shot-gunning: An individual takes out undisclosed multiple loans on a single property simultaneously and then disappears with the proceeds. This scheme is often associated with foreign investors and organized crime.

Silent Second: A hidden second mortgage on a property. For example, a seller gives a borrower a second mortgage that is not disclosed to the borrow or to the lender of the first mortgage. To conceal its existence, the second mortgage is usually not recorded until after the closing. The seller receives the proceeds of the mortgage, and the borrower has to make the mortgage payments.

Property Flipping: A property sold a short time after a previous closing on the same property, where the second sale includes a significant, unwarranted increase in value. While it is legal to flip a property if appropriate improvements are made, flipping constitutes fraud when there is a significant value increase despite only minimal improvements to the property. A fraudulent appraisal is almost always involved. Illegal flipping can ruin the value of homes and neighborhoods. Further, lenders can lose money by providing large loans on over-valued properties.

Double Escrow: Two closings on the same property at once. For example, a borrower buys a property at one price and immediately sells the property at a higher price. Double escrow is a property flip with a shortened time frame, and is illegal if all terms are not disclosed to the involved parties.

Straw-buying: Using someone else's credit to secure a loan. The person whose credit is being used is the "straw buyer." The perpetrating parties are often related. For example, if an individual's brother cannot secure a loan to buy a house, the individual can offer his own credentials to secure the loan for his brother. For another example, an individual with good credit may be approached and offered money to lend his name and good credit to multiple transactions.

Air Loans: All documentation is fabricated to secure a loan. There is no property and no borrower.

Identification ("ID") Theft: Identity of a borrower or a mortgage professional is stolen and misused in a loan transaction.

Asset Rentals: Programs where assets, such as bank balances, cash, and strong credit card lines, are "borrowed" from their owners to make perspective borrowers appear financially sound. This scheme appears frequently on the internet. Usually, the asset "lenders" are compensated in some way.

Mortgage Debt Elimination Schemes: Fraudsters present faulty legal reasons why a particular mortgage or group of mortgages does not have to be paid. This scheme can be complicated and frequently appears on the internet. The Federal Reserve Board explains the scheme here: http://www.federalreserve.gov/boarddocs/srletters/2004/sr0403.htm.

Cash-back Schemes: A lender is deceived by a seller, a buyer, or both, as to the actual sales price of the property. An inflated appraisal is often involved to convince the lender to lend too much on the property. The proceeds are split among the perpetrators.

Non Arm's Length Transactions: Transactions where there is an undisclosed familial or professional relationship between a professional in the loan transaction and another involved party.

Mortgage fraud can also occur in ways different from those discussed above. Indeed other types of encountered examples include: misrepresentations on a mortgage application, inflated appraisals, appraisals with inappropriate comparables, employment and/or income misrepresentation (for example, on pay stubs, W-2s, tax returns, or Verifications of Employment), failure to disclose debts and/or other liabilities, failure to disclose correct employment status, use of invalid borrower SSNs, fabricated or misrepresented monthly housing payments (e.g., rent or mortgage payments), falsified bank statements or accounts, falsified gift letters, occupancy misrepresentation (e.g., primary residence vs. investment property), incorrect transaction type (e.g., purchase vs. refinance), borrower and/or seller not properly listed on property title, misrepresented closing costs, or closing funds distributed to unauthorized parties, misrepresented down payments, and unauthorized activity by unlicensed professionals.

As is readily apparent from the above discussion, mortgage fraud occurs in many different forms. While some fraud schemes are known, new schemes are hatched by fraudsters in an effort to outpace detection efforts. Fraud schemes and fraudulent misrepresentations are financially detrimental not only to those involved, but are also detrimental to communities in which subject properties are located and financial markets as a whole.

What is needed, therefore, are mortgage fraud detection devices, systems, and methods enabling users to detect fraudulent activity so that measures can be taken to mitigate fraud risks and stop fraudulent activities before financial losses occur. It is to the provision of such fraud detection systems, devices, and methods that the various embodiments of the present invention are directed.

SUMMARY OF SAMPLE EMBODIMENTS

Briefly described, various embodiments of the present invention generally comprise a fraud detection database, a fraud detection database system for detecting signs of fraud, and methods for analyzing various data resources to detect fraud. Fraud detection may occur in mortgage loan applications as well as many other financial applications (e.g., auto loan, credit card, and many other personal property loans). System users, such as lenders, can submit loan application data to a fraud detection system. Loan application data can include information from a borrower's mortgage loan application, such as information entered on a Uniform Residential Loan Application (Form 1003). Other submitted information may also include additional information from lenders and originator information, information on brokers, realtors, or appraisers involved in the borrower's transaction.

Detecting fraud through a database system can generally comprise providing a database for storing and/or maintaining a set of records. The records can include various types of financial information. A database operator can access, receive, and/or utilize financial information records from a plurality of sources including pre-existing databases and/or lending institutions. For example, a database operator can configure a fraud detection system to compare a first data record to a second data record to determine whether the two records are preliminary matches. The first data record may be received from a lending institution and the second data record may include pre-existing stored data. Records can be preliminary matches if they have certain data in common. When records represent loan applications, for example, the data can include any one or more of borrower names, borrower SSNs, and real property addresses for which a mortgage loan is requested.

Preliminary matches can also be compared for inconsistent information for fraud detection. If inconsistent information is found, the inconsistent preliminarily matching records may be flagged. The inconsistent information need not be the same category of information examined to determine preliminary matching. For example, two application data sets with the same borrower name or property address but with different appraisal values can be flagged in the database.

Embodiments of the present invention also enable report generation so that end users can review results of data analysis. In some embodiments, end users may be system subscribers that submitted one or more data records to a fraud detection system. Reports preferably show results of data comparisons in a format easily and readily understood by end users. In some embodiments, it may be preferable that a database operator can report whether records were preliminary matches and also whether the two records were flagged as inconsistent as well.

Generally, fraud detection embodiments of the present invention are configured to receive input data records. Such data input can be provided by end users who are using embodiments of the present invention to detect fraud in a financial loan environment. As records are received from end users, received records can be compared with other records. Comparisons can be made initially upon receipt and also conducted at predetermined frequencies to continue monitoring for possible fraudulent activities.

To implement periodic, frequent comparisons, records can undergo one or more waiting periods between comparisons. Waiting periods can be many time periods, for example, approximately one day, such that a set of comparisons occurs daily for each record. During waiting periods, additional records can be received. At the end of a waiting period, a first received record can be compared to one or more second records. Based on these new comparisons, reports can be generated for subscribers. This feature of embodiments of the present invention enables continuous monitoring of loan transaction to detect fraudulent activities occurring within close time periods. Comparisons can occur periodically by repeatedly comparing already received records to newly received records.

Periodic comparisons can continue until the termination of a predetermined holding period. During a holding period, received records can be retained in a database in an active state, meaning periodic comparisons continue. The holding period can be, for example, approximately 30 days to approximately 90 days in some embodiments. For example, each stored or received record can be compared daily to other stored or received records for 61 days after the record is submitted to a database operator or entered into the database. Other holding period lengths may also be used in accordance with embodiments of the present invention (for example, ranging between 120 days to twelve months).

On a larger scale, fraud detection system embodiments of the present invention can be configured to receive a plurality of records from a plurality of users (e.g., contributory subscribers). Periodically in bulk, or individually as they are received, records are stored in a database. After a new record is received, it can be compared to records preexisting in the database. A database operator alone or in combination with a reporting program can report comparison results to subscribers submitting records and to subscribers that submitted records preexisting in the database. The results in such reports can be ordered according to a two-tier weighted algorithm.

As used herein, a database operator need not be a human being. For example and not limitation, the database operator can be a computer system, a computer program, one or more modules of a computer system, or a combination thereof. A receiving module can receive records submitted from outside sources, including system subscribers or end users. A comparing module can compare records to each other. A reporting module can report results to subscribers. Additionally or alternatively, a database operating module can conduct one or more of the tasks performed by the database operator.

Operations of the database operator and of the database system can be performed by a computer system. Accordingly, such operations can be stored on a computer-readable medium of expression, and performed by a computer processor. In addition, the various modules discussed herein can be implemented as hardware, software, or a combination thereof.

In another embodiment of the present invention, a fraud detection system to detect fraud in a financial loan application process by analyzing a plurality of data from multiple sources is provided. The system can generally comprise one or more interfaces (e.g., communication interfaces) to receive data, a database, and a processing module. The interfaces can be configured to receive data from a plurality of unique data sources. The data sources can comprise information received from unique end users and existing unique databases. The data can comprise data records comprising at least one of information related to a financial loan application, parties involved in a loan transaction, and property involved in a financial loan. The database can be configured to receive data from a plurality of unique data sources and to store data with an identifier configured to distinguish data received from unique data sources.

The database can include a processing module or may be operatively coupled to a processor configured to implement a processing module. The processing module can be configured to determine if one or more data records contain one or more matching data fields and flag data records containing one or more matching data fields. Matching information can be stored in a match table, which can be a stand alone memory or associated with the database. The processing module can be further configured to determine if one or more of flagged data records contain different information in one or more other data fields contained in the data records. And data records flagged to contain different information can be stored in the match table.

Fraud detection systems according to the present invention can also include other features. For example, matching data fields can comprise information about property involved in a financial loan and at least a party involved in a loan transaction. In addition, a system can also include a reporting module configured to report information concerning data records containing one or more matching data fields and information concerning the flagged data records containing different information in the one or more predetermined data fields. A reporting module can be further configured to order information contained in a report at least partially based on different information contained in the one or more data fields and a magnitude of difference. In another aspect, a processing module further can be configured to place received data records in an active state for a predetermined holding period and periodically analyze active-state data records relative to existing data and data received after the active-state data records. Predetermined holding periods can range from approximately one day to approximately one year. In yet another aspect, a processing module can be configured to determine if one or more of data records contain substantially similar addresses for a real estate property involved in a loan transaction.

In yet another embodiment of the present invention, a method for detecting fraud in a financial credit or loan application process is provided. A fraud detection method can generally comprise providing a database operatively configured to receive data comprising details concerning a financial credit or loan application and to store received data as one or more first data records. A fraud detection method can also include configuring a database to receive data from a plurality of unique data sources and store data with an identifier for distinguishing the unique data sources. The data can comprise at least one of, one or more parties involved in a loan transaction, and property involved in a financial application process. A fraud detection method can also include providing a data comparison module operatively configured to flag the one or more first data records containing similar data in one or more predetermined data fields by storing matching information in a table. Also, a fraud detection method can include configuring a data comparison module to determine if the flagged data records comprising at least one data field with similar data comprise one or more other data fields having inconsistent data by storing inconsistent data in the table.

Fraud detection methods according to the present invention can also include other features. For example, a method can include configuring a database to provide reports comprising details related to flagged data records comprising at least one data field with similar data and details related to flagged data records comprising data fields with inconsistent data. A method can also include configuring a database to receive data from a plurality of end users and the one or more databases via a communications network. A method can also include providing a data comparison module operatively configured to flag data records containing similar data in one or more predetermined data fields by determining if the one or more data records contain data fields having similar property address information or similar borrower information.

Fraud detection methods of the present invention can also include additional aspects. As an example, a method can include configuring a database to provide reports to a user with data ordered based on results of a two-tier weighted algorithm. Also, a method can include holding data records in the database for a predetermined holding period and configuring the data comparison module to compare existing data records to data records received after the existing data records at predefined intervals. A method can also include operatively configuring a database to receive lender originated data and user incident report data. In addition a method can include configuring a data comparison module to receive professional license information from one or more existing databases to determine if a licensed party involved in a loan transaction is properly licensed and has any past professional sanctions.

In still yet other embodiments of the present invention, computer-readable media containing code for execution by a processor are provided. These embodiments can include stored computer readable instructions to execute a method for detecting fraud and/or implement a system for detecting fraud. Such code can include instructions for providing a database configured to receive data from a plurality of unique data sources and associate received data with an identifier to distinguish the unique data sources. The data can comprise data records having data fields. The data records can comprise information related to a financial loan application, parties involved in a loan transaction, and property involved in a financial loan. Another instruction in the code can include determining whether one of the data records has a data field containing common data to at least one other data field contained within at least one of the other data records. And another instruction in the code can include determining whether data records having at least one data field in common have other data fields having disparate data. And still yet another code instruction can include providing a report comprising data records based at least partially on the identifier. The report can include a listing of data records with data fields having common data and data records containing data fields having disparate data.

Computer-readable medium embodiments having stored code can also include additional aspects. For example, within the code, instructions can be provided such that at least a portion of data records contain mortgage loan application information submitted by unique users and at least another portion of the data records contain information obtained from pre-existing databases containing borrower information. Such code can enable a dual pipeline feature as discussed herein. Another exemplary aspect includes providing code instructions such that data fields are reviewed for common data, including property address information, to determine if a single property is subject to multiple loan applications. Also, code instructions can be provided on a medium to repeatedly determining on a pre-determined basis whether data records have data fields containing common data relative to other data fields contained within other data records, and whether data records having data fields in common also have data fields having disparate data.

Other aspects and features of embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures, all embodiments of the present invention can include one or more of the advantageous features discussed herein. In other words, while one or more embodiments may be discussed as having certain advantageous features, one or more of such features may also be used in accordance with the various embodiments of the invention discussed herein. In addition, while discussion contained herein may, at times, focus on mortgages and mortgage application processes, embodiments of the present invention can also be used in other financial and financial application settings. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 6A-6F illustrate exemplary reports provided by a fraud detection system according to some embodiments of the present invention.

DETAILED DESCRIPTION OF PREFERRED & ALTERNATIVE EMBODIMENTS

To facilitate an understanding of the principles and features of the various embodiments of the invention, various illustrative embodiments are explained below. Indeed, embodiments of the present invention are described below for detecting signs of fraud in mortgage loan applications. Embodiments of the invention, however, are not so limited. Rather, embodiments of the invention can be used to detect fraud or to track patterns, similarities, or dissimilarities in many fields. For example and not limitation, embodiments of the present invention may be used to detect fraud in credit card applications, employment applications, and personal property loan applications.

The various embodiments of the present invention assist users in detecting fraud. To assist users in detecting fraud, embodiments of the present invention are configured to alert users of potential fraudulent activity so that users can further investigate the circumstances to mitigate fraud. For example, embodiments of the present invention can enable the mortgage lending community to more accurately determine the authenticity of the borrower/applicant wishing to obtain a mortgage for real estate.

In a mortgage fraud scenario that utilizes an identity, fraudsters may falsify information related to names, social security numbers, or both in an effort to create false mortgage transaction and escape detection. By simply transposing a few numbers in a social security number a fraudster can assume an identity and begin establishing a historical record of credit as a part of the process for stealing the identity. Additionally, multiple names can be used with a single social security number in an effort to thwart off detection. The alternate names are submitted to multiple lenders to avoid being spotted during the process. Lenders are currently vulnerable to this type of attack because there is no system that enables identity variances across multiple transactions while verifying information provided by borrowers to lenders in a loan transaction.

As discussed below with reference to exemplary embodiments of the present invention, the various embodiments can be used to help mitigate potential fraudulent activities. The below discussion, while provided in various sections, should be read as a whole as to applying to this entire disclosure and the various discussed embodiments. Thus, discussion of one or more features in a certain section can also be pertinent to other features and embodiments discussed in one or more other sections.

Fraud Detection System & Components Generally

Figure 1:
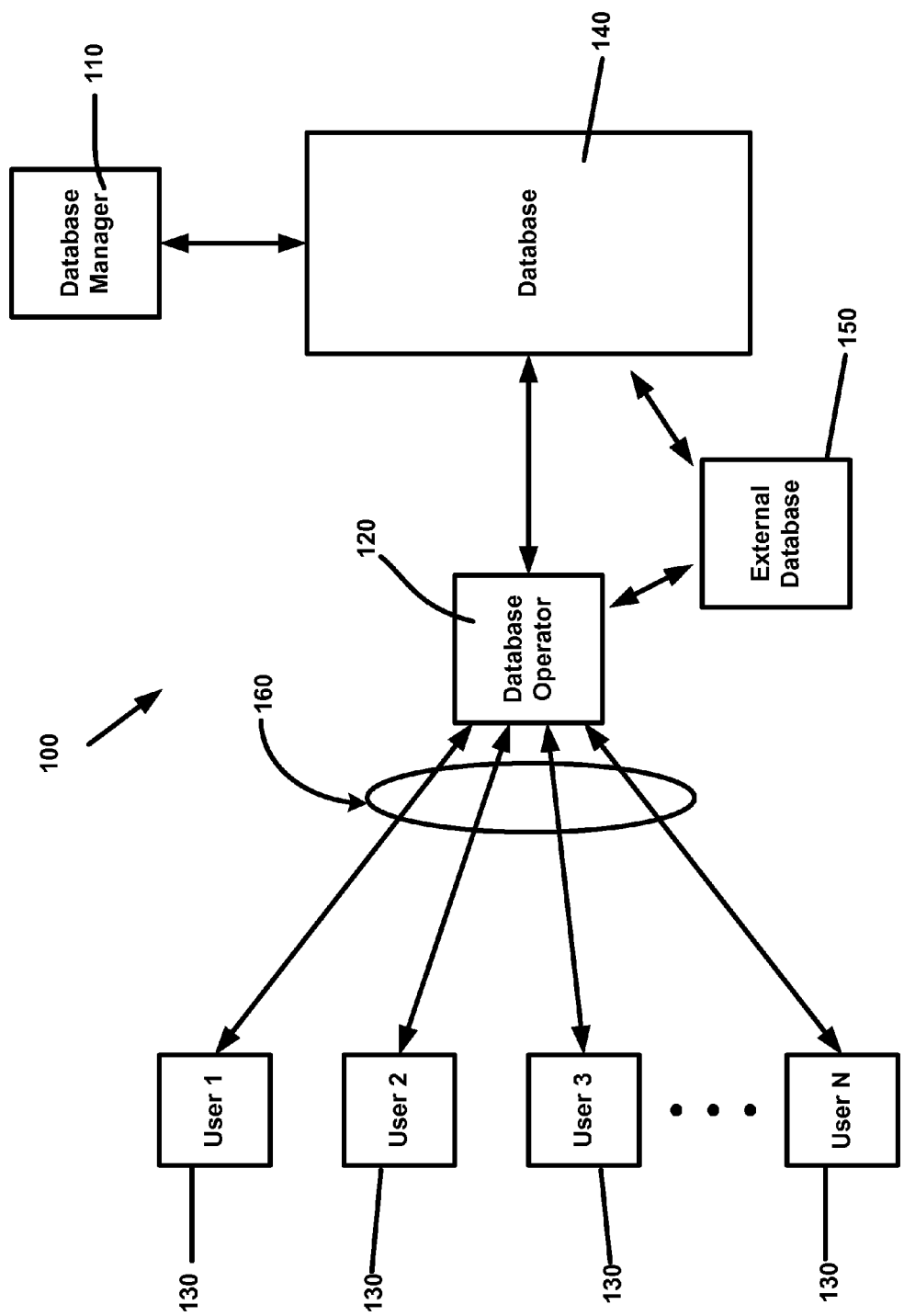
FIG. 1 illustrates a block diagram of a fraud detection system according to some embodiments of the present invention.

Referring now to the figures, wherein like reference numerals represent like parts throughout the views, exemplary embodiments of fraud detection systems and methods are described in detail. FIG. 1 illustrates a diagram showing components of a fraud detection database system 100 according to some embodiments of the present invention. The database system 100 can generally comprise at least one database manager 110, at least one database operator 120, one or more users 130, and a database 140. The database system 100 may also comprise one or more external databases 150 for providing additional information to the database 140. The database 140 (and/or the database operator 120 or the database manager 110) can be configured to access one or more external databases 150 to provide additional data to the system 100 to provide enhanced fraud detection capabilities.

As shown by the various arrows in FIG. 1, the illustrated components of the system 100 can be networked together. Such networking enables the system's 100 components to exchange and share data. For example, users 130 are preferably networked with the database operator 120 via a network, such as network 160. Network 160 may be a private or public network. In a currently preferred embodiment, the network 160 can include the internet. This configuration enables users 130 to access and utilize fraud detection via an internet, web-based interface. In this manner, users 130 can access an internet portal to query and search data maintained in the database 140 to obtain desired information. As discussed in more detail below, the database operator 120 can include various processing modules for automated querying of the database and for reporting results to users. Such reporting can occur based on user defined search queries and user defined search frequencies. The network 160 can also be a private network and also have both public and private features to enable implementation of varying security protocols.

Although several of the components in the system 100 are shown as stand-alone components, certain of the components may be integrated together. For example, one or more of the database manager 110, the database operator 120, and the database 140 can be integrated together in a single physical device. In such an embodiment, a single physical device enables a centralized database system 100 at a single location. In addition, one or more of the database manager 110, the database operator 120, and the database 140 can have various components capable of implementing required functionality. For example, the database 140 may have one or more data storage units located at one location or located at different locations. It should be understood that if one or more of the database manager 110, the database operator 120, and the database 140 have several components such components can be networked together to enable system functionality.

To implement the fraud detection system 100, each system component can have various operation functions. For example, the database manager 110 can initialize and maintain the database 140. The manager 110 can perform, or cause to be performed, maintenance required by the database 140. The manager 110 can also ensure that users 130 execute legal and other documentation desirable for participation in the database system 100.

The database operator 120 can be configured to perform database tasks as desired. For example, the database operator 120 can conduct queries on the database 140, and in response to the queries, the operator 120 can receive data from the database 140. Based on data received from the database, the operator 120 can output reports to users 130. The database operator 120 can also accept data submitted by users 130 and can transfer the submitted data to the database 140. As discussed herein, users 130 can provide data related to or concerning financial loan transaction applications (e.g., mortgage loan information and fraud incident information). The database operator 120 is also preferably configured to enable and accept batches of data from many different users 130. The system 100 is contemplated, in some embodiments, as a very dynamic system that is on a real time basis receiving information from many different sources and reporting information to users in response to queries. Use of such raw, current data for analysis can help to enable real time detection of fraud.

The database operator 120 can also be configured to have numerous operational characteristics. For example, in some embodiments, the database operator 120 can include web service functions to enable an internet interface between users 130 and the database. Inclusion of web service functions enables users to access the fraud detection system 100, to query the database 140, and obtain data in an effort to learn additional information about parties to a financial application. Thus, database operator 120 can include various processing modules configured to search and analyze data according to predetermined data tests. Such data tests can compare data from various sources on a wide-scale basis and provide results of the comparisons to users. In some embodiments, the database operator 120 can be, for example, a module of the database 140 capable of executing computer code. Additionally, and/or alternatively, the database operator 120 can be a device, a segment of code, a computer system adapted to operate in conjunction with the database 140, a database operating module of a computer system, and/or a combination thereof. In currently preferred embodiments, the database operator 120 can comprise a plurality of modules, such as, for example, a receiving module comprising data interfaces for receiving records, a comparing module for comparing records, and a reporting module for reporting results. The database operator 120 can also provide an interface enabling users to submit and obtain data to the database 140.

Users 130 of the system can be various types of people or entities desiring assistance in detecting fraud. For example, users 130 can be subscribers who are entities, such as mortgage lenders, banks, or mortgage brokers, who subscribe to the database system 100. Users can also include mortgage bankers, financial lending institutions, real estate agents, appraisers, closing agents, mortgage portfolio investors, home builders, title companies, loan servicers, loan consolidators, accountants, attorneys, banks, direct consumers, other mortgage related agencies, and non-mortgage related agencies. Users 130 may also include law enforcement personnel and others involved in investigating and prosecuting fraudsters.

In addition to using the system 100 to obtain information about those involved in financial application processes, users can also provide information to the system 100. For example, users 130 can submit records to the database operator 120 for submission to the database 140. Such records can include mortgage loan application information (e.g., Uniform Residential Loan Application—Form 1003) and also fraud incident information. By accepting information from users, the system can advantageously obtain information from users who interact with mortgage-related transactions on a daily basis thereby providing a dynamic system capable of obtaining current and fresh data. This enables users to cross check their data with other users and enables the system 100 to consider data from numerous users in an effort to flag possible fraud conditions.

Users 130 can also receive reports of potential fraud from the database operator 120. Upon receiving such results, users 130 can take steps to investigate one or more flagged loan transactions. In currently preferred embodiments, the database operator 120 enables users to log in to the system 100 and view transactions in the user's internal pipeline and transactions external to the user's pipeline. For example, lender A may desire to track loan transactions in its pipeline for potential fraud activity and also track loan transactions external to lender A's pipeline. In this manner, lender A can track loans in the pipeline of other lenders to see if any loan transactions in lender A's pipelines contain similar person data to transactions of other lenders. The dual pipeline feature advantageously enables users (such as brokers and lenders) to cross check transactions in their pipeline with transactions in one or more users' pipelines. As a result, this feature can help inform users if their clients are also interacting with other users who have submitted data to the database 140.

The database 140 maintains the records submitted via the database operator 120. The records can comprise data records (or data sets) with various data fields. Preferably, the data records have a uniform format with uniform data fields. Such uniformity enables the database operator 120 to compare and contrast data contained in the data records to determine existence of possible fraudulent activity. In some embodiments, the database operator 120 and/or the database 140 can validate received data records to ensure appropriate format. The volume of records submitted to the database 140 can be, for example, upwards of approximately one thousand per day per user 130. Preferably, the database 140 is scalable to enable receipt of less or more records on a daily basis as desired. The database 140 is preferably configured to maintain this volume of data. The database 140 is preferably also a storage facility capable of storing large amounts of data.

Provision & Receipt of Data for Investigating Fraud

Figure 2:
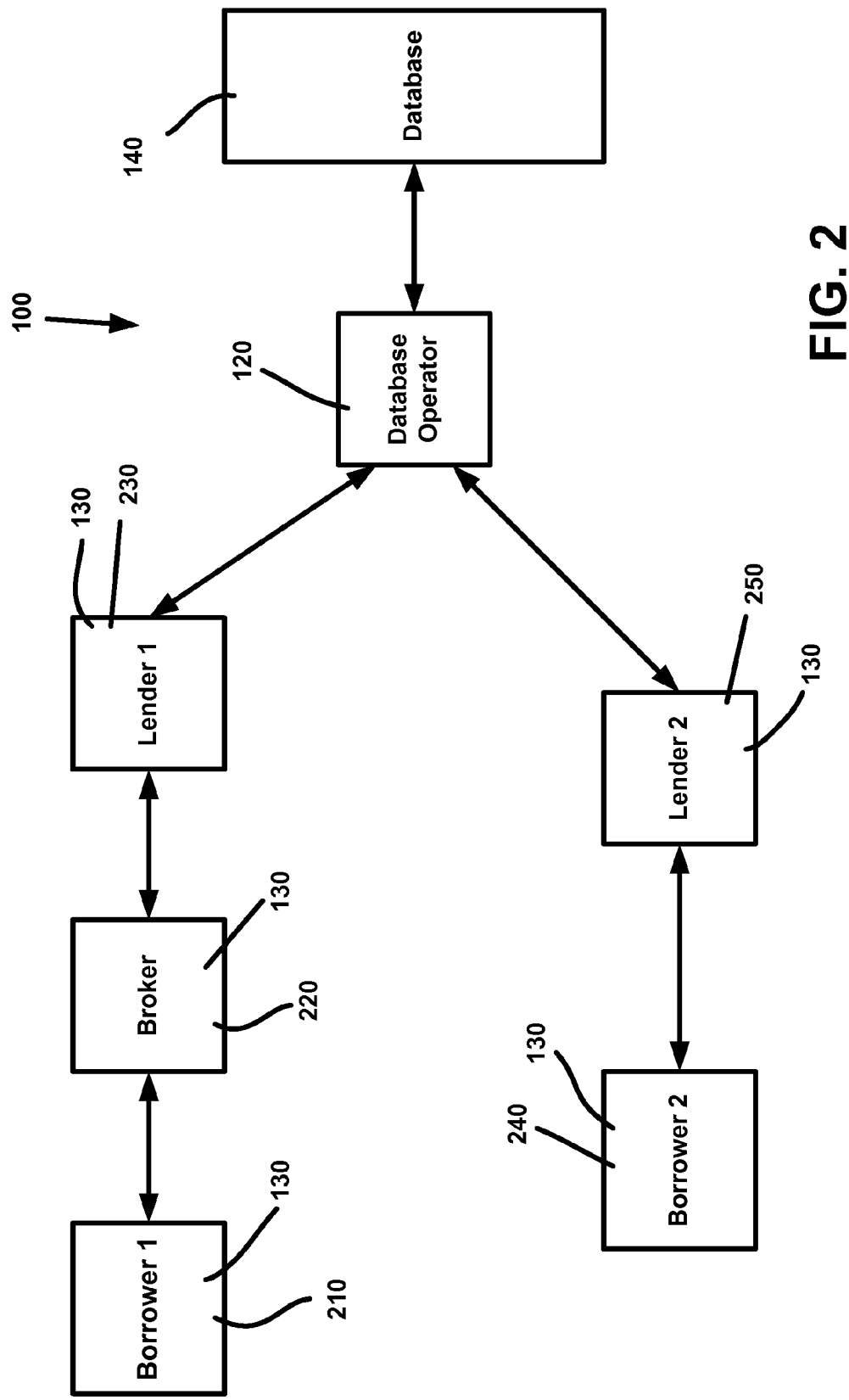
FIG. 2 illustrates an information flow diagram in a fraud detection system according to some embodiments of the present invention.

FIG. 2 illustrates an information flow diagram in a fraud detection system according to some embodiments of the present invention. For example, FIG. 2 specifically illustrates a flow diagram 200 of information from various system users 130 to a fraud detection system 100. In one aspect, a first borrower 210, borrower 1, applies for a loan through a mortgage broker 220. In doing so, borrower 1 210 discloses certain application information to broker 220. In turn, broker 220 discloses this information to a user 130, lender 1 230. Lender 1 230 submits to a database operator 120 a record relating to and containing information contained in borrower 1's loan application. The database operator 120 received this record and enters the record into the database 140. In some instances, the provided record may be used to update or refresh an existing record.

FIG. 2 also illustrates additional users 130 providing data to the fraud detection system 100. Indeed, FIG. 2 shows that a second borrower 240 provides mortgage loan application directly through a second lender 250. The second lender 250 can submit borrower 2's 240 application information to the system 100 via the database operator 120. The database operator 120 can submit the information to the database 140 as a new record (or an updated or refreshed version of an existing record). While not illustrated, it should be understood that a plurality of users 130 can provide information to the fraud detection system 100 at varying rates as desired. In addition, while certain users shown in FIG. 2 are directly communicating with the fraud detection system 100, all users 130 can be configured to communicate with other users through the fraud detection system 100.

As users 130 may submit potentially confidential information to the database 140, it may be desired that involved parties enter into agreements for protection. For example, users 130 can certify that they understand the database system 100 reports tips and leads only, and that decisions of whether to accept or deny loan applications should not be made solely based on such reports. Users 130 can also certify that their use of reports will comply with applicable laws and regulations, including the Fair Credit Reporting Act ("FCRA"). Further, it may desired to have users 130 indemnify the database operator 120 and the database manager 110. The database manager 110 can ensure that these legal documents are executed.

For any single loan application, the corresponding record submitted to the database operator 120 by a subscriber 130 can consist of originator information as well as borrower information from a loan application, such as the Uniform Residential Loan Application. Originator information, or originator data, can include data on an entity originating the loan application. For example, originator information can include the name of a mortgage broker and other information related to and unique to the mortgage broker. The following list represents a non-exclusive list of data that may be included in originator information submitted to the database operator 120 in a data record:

Contract Date
Contract Price
Realtor Name
Realtor License Number
Realtor Company Name
Originator Name
Originator Company Name
Originator License
Originator Address
Appraiser Name
Appraiser License Number
Appraiser Company Name
Appraisal Value
Comparable Property Addresses (×6)
Comparable Property Values (×6)
Closing Date Closing Agent
Title Company
Escrow Agent
Escrow Company Borrower information, or borrower data, comprises data supplied by the borrower in a loan application. This data can be based on documentation from borrowers. The following list presents a non-exclusive list of borrower information that can submitted by subscribers 130. Not all listed items need be submitted by every subscriber in every instance, and additional data may be submitted in addition to or in lieu of the listed items.

Borrower Last Name
Borrower First Name
Borrower Middle Name/Initial
Borrower Suffix (Jr/Sr/II/III—etc.)
Borrower SSN
Borrower ITIN
Borrower Current Address
Borrower Prior Address
Seller/Owner Last Name
Seller/Owner First Name
Seller/Owner Address
Subject Property Address
Subject Property Parcel ID Number
Subject Property—Year Lot Acquired
Subject Property—Original Cost
Subject Property—Amount of Existing Liens
Subject Property—Year Acquired
Subject Property—Original Cost
Subject Property—Amount of Existing Liens
Subject Property—Purpose of Refinance
Subject Property—Cost of Improvements
Subject Property—Status of Improvements
Loan Amount
Source of Down Payment, Settlement Charges and/or Subordinate Financing
Current Employer Name
Current Employer Address
Current Employer Phone
Current Employment—Years on this job
Current Employment—Position/Title
Current Employment—Self-Employment Flag
Prior Employer Name (×2 instances)
Prior Employer Address (×2)
Prior Employer Phone (×2)
Prior Employment—Years on job (×2)
Prior Employment—Position/Title (×2)
Prior Employment—Monthly Income (×2)
Prior Employment—Self-Employment Flag (×2)
Asset Account—Company Name (×4 instances)
Asset Account—Company Address (×4)
Asset Account Number (×4)
Asset Account Balance (×4)
Asset—(Cash or Mkt. Value of all) Real Estate Owned
Liability Account—Company Name (×6 instances)
Liability Account—Company Address (×6 instances)
Liability Account Number (×6)
Liability Account—Monthly Payment (×6)
Liability Account—Months Left to Pay (×6)
Liability Account—Unpaid Balance (×6)
Monthly Income—Base Monthly Income
Monthly Income—Overtime
Monthly Income—Bonuses
Monthly Income—Commissions
Monthly Income—Dividends/Interest
Monthly Income—Net Rental Income
Monthly Income—Other
Monthly Housing Expense—Rent
Monthly Housing Expense—1st Mortgage (P&I)
Monthly Housing Expense—Other Financing. (P&I)
Monthly Housing Expense—Hazard Ins.
Monthly Housing Expense—RE Taxes
Monthly Housing Expense—Mort. Ins.
Monthly Housing Expense—HOA Dues
Monthly Housing Expense—Other
RE Owned—Address (×3)
RE Owned—Rent, Sold or Pending Sale (PS) Flag (×3)
RE Owned—Present Market Value (×3)
RE Owned—Amount of Mortgages/Liens (×3)
RE Owned—Net Rental Income (×3)
Liens/Judgments
Bankruptcies
Foreclosure
Occupancy Status
Application Date
Purpose of Loan
Loan Type
Transaction Details—Purchase Price
Transaction Details—Alterations, Improvements, Repairs
Transaction Details—Refinance
Transaction Details—Estimated Prepaids
Transaction Details—Estimated Closing Costs
Transaction Details—Subordinate Financing
Transaction Details—Borrower CC paid by Seller
Transaction Details—Other Credits
Transaction Details—Cash from/to Borrower
Declarations—Outstanding Judgments (Y/N)
Declarations—Declared Bankruptcy in past 7 yrs (Y/N)
Declarations—Subject of foreclosures, DIL in past 7 yrs (Y/N)
Declarations—Party of a lawsuit (Y/N)
Declarations—Obligated on any "problem" loan (Y/N)
Declarations—Is any part of down payment borrowed? (Y/N)
Declarations—Co-maker or endorser on a note? (Y/N)
Declarations—Are you a U.S. citizen (Y/N)
Declarations—Do you intend to occupy property (Y/N)
Borrower Phone Number
Amortization Type
Credit bureau scores and other bureau data
Occupation information
Number of homes purchased Users 130 can provide data to the system 100 in a variety of manners. In some embodiments, data can be provided on a batch basis and in others on a single record basis. Transfer of batch data can occur at random times or in accordance with a predetermined data transfer protocol. For example, some users may desire to transfer loan application information on a daily basis as loan transactions are initiated and as loan transactions move through a lifecycle process. Alternative manners of providing data to the detection system include submitting incidents of fraud data and commenting on existing fraud scenarios. By enabling users to submit transaction data to the system 100, the system 100 can advantageously receive fresh raw data to analyze for potential fraud occurrences and provide reports indicating possible fraud to system users.

Analyzing, Testing, & Processing of Received Data

As embodiments of the present invention receive data from users, the data can be analyzed for possible occurrences of fraud. When such fraud occurrences are determined to exist for one or more transactions (e.g., a mortgage loan application), embodiments of the present invention can flag such occurrences so that users can further investigate flagged transactions. To investigate possible fraudulent occurrences, fraud detection systems according to embodiments of the present invention generally compare received records to each other in an effort to locate possible fraudulent activity. In addition, embodiments of the present invention can also be configured to access already existing external databases to obtain additional data for comparison to received records from users. Data comparison of data records can be done on a data field basis to determine if disparate data exists and to determine a magnitude of difference between data fields.

Figure 3:
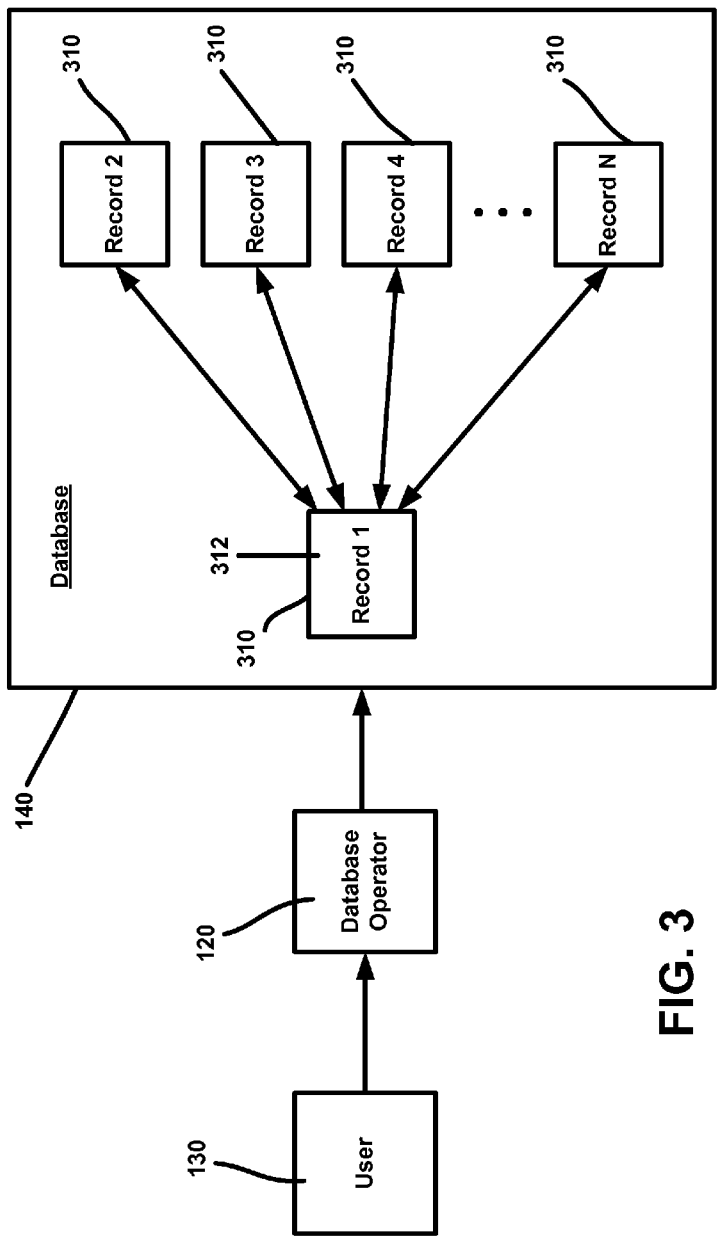
FIG. 3 illustrates comparing one record to one or more records in a fraud detection system according to some embodiments of the present invention.

FIG. 3 illustrates comparing one record to one or more records in a fraud detection system according to some embodiments of the present invention. As illustrated, FIG. 3 shows a diagram showing how data records 310 are compared to other records in a database according to some embodiments of the present invention. For example, a first exemplary record 312 can be submitted to the database 140 from a user 130 via the database operator 120. After submission, and periodically for a predetermined period, the first record 312 can be compared to other records 310 in the database 140 (other records are shown as Records 2, 3, 4, through N). By comparing records to each other, fraud detection systems according to embodiments of the present invention can determine if applicant information differs from existing or other information sources across many numbers of records. By performing such checks, the fraud detection system can flag possible fraud occurrences and report the same to users.

In currently preferred embodiments, comparison of records can include multiple predetermined checks. For example, comparing the first record 312 to another record 310 can generally comprise two checks. These checks can be, but need not be, performed by the database operator 120 or a processing module implemented in one or more components in a fraud detection system.

A first check can include determining whether records are matches, or preliminary matches. Preliminarily matching records 310 can comprise similar information in certain data fields. For example, and not limitation, records 310 with the same borrower name, the same property location or address, and/or the same social security number can be deemed matches. In alternative embodiments, other data records can be checked for consistent data in certain data fields (such as those in the above provided lists). Data records having consistent or matching data in one or more predetermined fields can be flagged for subsequent processing. In the event that records do not contain consistent data in one or more predetermined fields, no further comparison may be required. Alternatively, data records having inconsistent data in data fields may be flagged for subsequent processing.

A second check can determine if records flagged as having consistent data in one or more data fields have inconsistent data in various other data fields. For example, a second check can determine if records flagged as matches include inconsistent data, such as contradictory data in such fields as appraisal value, loan amount, borrower SSN, and borrower account/income values. If inconsistent data is found in one or more of the records 310, the records 310 can be flagged. For example, and not limitation, if a first record 312 includes a borrower income of $55,000, and another record 310 includes a borrower income of $155,000, the two records 310 can be flagged. Such disparate data may be a sign of a fraudulent occurrence, and in response, the database operator 120 can return flagged records 310 to subscribers 130 in the form of reports. Similarly, the database operator 120 can also return matches to subscribers 130 in reports.

While FIG. 3 may suggest that comparisons are implemented through a direct comparison between records 310, this particular implementation is not required. For example, and not limitation, digital references to the records 310 can be sorted over borrower social security numbers, borrower names, property locations, or any combination of these three (as well as the above-listed data fields). Accordingly, determining matches between records can include examination of records 310 nearby the record with respect to the sorted order.

Figure 4:
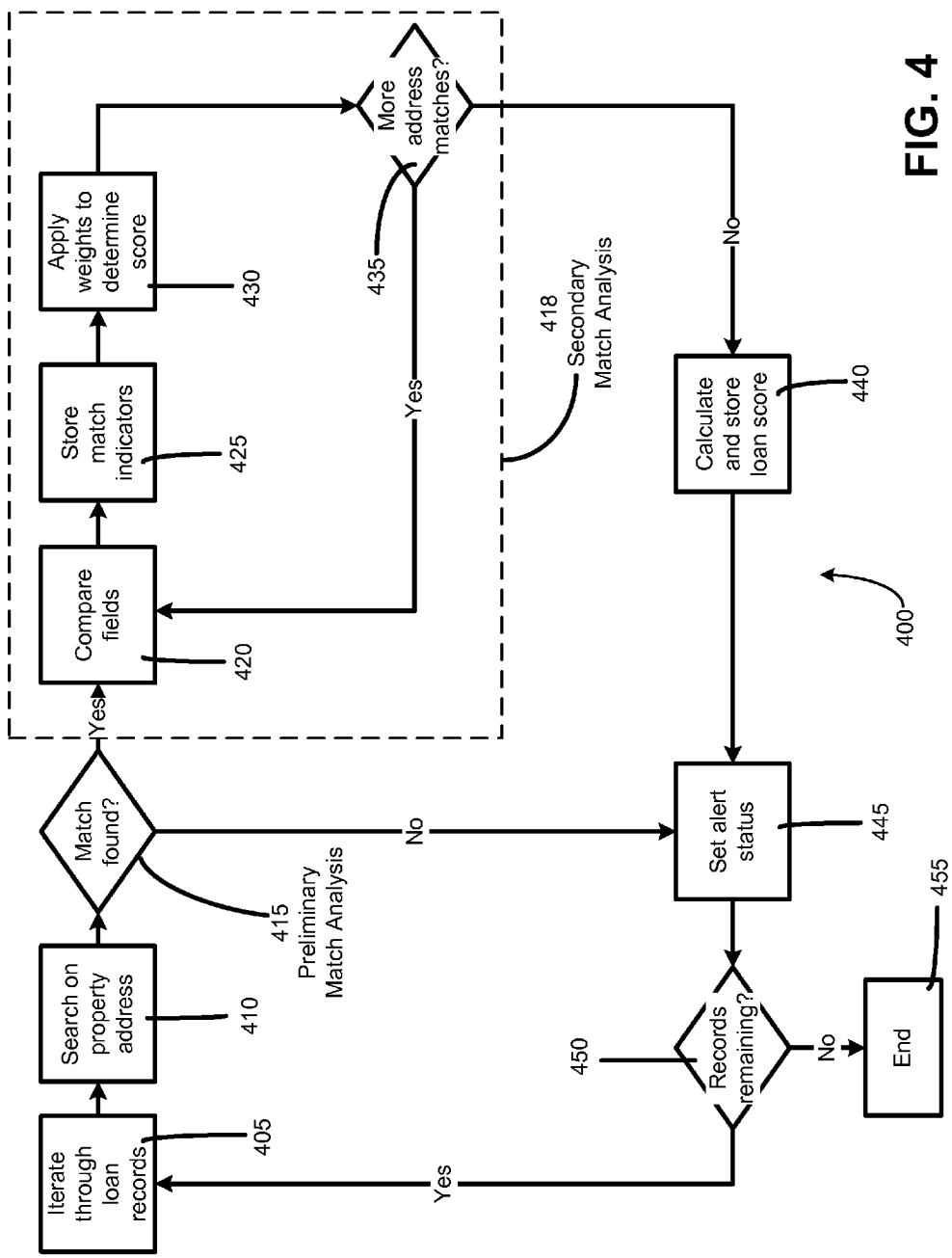
FIG. 4 illustrates a fraud detection method according to some embodiments of the present invention.

FIG. 4 illustrates a method 400 of detecting fraud according to some embodiments of the present invention. Those skilled in the art will understand that method 400 can be performed in various orders (including differently than illustrated in FIG. 4), additional actions can be implemented as part of a method embodiment, and that some actions pictured in FIG. 4 are not necessary. In addition, it should be understood that while certain actions illustrated in FIG. 4 may be discussed herein as including certain other actions, these certain other actions may be carried out in various orders and/or as parts of the other actions depicted in FIG. 4. Method embodiments of the present invention, such as the one depicted in FIG. 4, may be implemented with the fraud detection devices and systems discussed herein.

The method 400 generally initiates by receiving data from one or more data sources. The received data can be stored in one or more databases. Data sources can include one or more contributory users as well as one or more existing databases. Records may be received on a routine frequent basis (e.g., daily at a set time or bi-weekly) or as desired (e.g., on a random, unscheduled basis). Indeed, users may submit records on a nightly basis and a fraud detection system may access and/or obtain information stored in one or more other databases as needed. It is contemplated by the inventors that many data records (e.g., 1000 or more per day) will be received to enable the various fraud detection methods to assist in fraud detection. The method 400 can also include verifying that a submitted data record is submitted by a valid subscriber by checking a subscriber registry.

Upon receiving data, the method 400 may also include verifying that the received data is compliant with a predetermined data record format. Verification ensures that data originating from various and sometimes disparate sources, is in a data record format to enable data comparison and analysis. The specific format of a data record (which can include any of the data fields listed herein as well as other desired data) is not important. What is important is that data records have the same format or have corresponding data fields. For example, in some embodiments it may be desired to have data records with the same data fields within the data record (e.g., same data record layout). This configuration can readily enable comparison of data fields within data records and accurate, efficient analysis of data fields.

The method 400 can also include an initial review of records. The initial review can include iterating through many records as illustrated at 405. In some embodiments active and inactive records may be reviewed while in other embodiments only active or inactive records may be reviewed. Records may be changed from active to inactive or vice versa depending on a number of factors, including user selection, data threshold, or time stamp threshold. In addition, active or inactive status may be used to remove and/or add data records in and out of a user's internal pipeline. Records may also be updated during a lifecycle of an application process. The initial review may also include data record verification as discussed above. The process of initial review preferably yields a grouping or set of records (e.g., all active records) for further analysis.

Further analysis can include searching selected records to determine if the records have one or more common data fields. Such data fields may be deemed critical data fields for fraud detection purposes in that the data within these fields holds unique significance relative to other data fields. As illustrated at 410, the method 400 can include a further analysis to determine whether records have similar property address information. To do this, property address fields in each record are compared with other records. The method 400 may also include searching for records with, for example, similar borrower names or borrower social security numbers. Still yet, the method 400 can include searching for any combination of critical data fields, in addition to those discussed above, as desired by a user.

The method 400 can also include standardizing records. Standardization of records can occur at any time during implementation of the method 400. For example, standardization can occur prior to or after record verification and also prior to of after comparison of records. Standardization can assist in ensuring that data is in similar format thereby enabling efficient verification and comparison. Standardization can include converting received data to a standard form. As an example of standardization, address data (e.g., borrower addresses) can be converted to United States Postal Service format. This way, for example, St. and ST are converted to STREET. As another example, name prefixes (e.g., Mr., Ms., Mrs., etc.) and suffixes (e.g., Sr., Jr., III, etc.) can also be standardized such that common abbreviations and/or spellings are the same. A used standard for data is not important; rather, ensuring that data is standardized for ease of comparison is important for embodiments utilizing data standardization. In some embodiments, data standardization may only occur on some data fields while in others, data standardization may occur on all received data fields. Standardized data elements will, preferably, render the data in the same format.

As shown in FIG. 4, the method 400 can include determining whether preliminary matches between data fields in various data records are found. As an example, a fraud detection system can determine whether one or more matching records are found for a first record as a result of comparing predetermined data fields of various data records. As discussed herein, a preliminary match analysis can determine if data records have similar SSNs, borrower names, property addresses, or any combination thereof. If such matching records are found, the method 400 may denote that one or more preliminary matches have occurred. If no matching records are found, the method 400 can proceed to 450. And if matching records are found, the method can proceed to process 418 to determine any potential secondary matches.

As shown, process 450 inquires whether any new of unreviewed records exist. If such records exist, the method 400 can initiate again at 405. If no such records exist, the method 400 may end and await receipt of additional records and/or user instruction. If a preliminary match to other records is not found, the method 400 can then return that a loan application has no corresponding matches. As a result, the method 400 may deem a loan application to be a low risk application. In some embodiments, low risk applications may not be searched again and may also be flagged for reporting or non-reporting low risk applications to users depending on user reporting preferences.

As mentioned above, if a preliminary match is found by process 415, the method 400 can proceed to process 418 to determine potential secondary matches. As shown, process 418 can include several processes to determine potential secondary matches. For example, if a preliminary match is found across property address fields at 415, the method 400 can compare each field of matching records. The secondary match analysis 418, in some embodiments, is advantageously configured to determine if any records having preliminary matches (e.g., have matching property addresses) have data fields with disparate information (e.g., different appraisal values). Thus, process 420 can include comparing records to locate data fields with disparate information. A matching table can be provided for storing matching records, or references or pointers to such records. The matching table can also be configured to store information about matches, including whether a matching record was found in an external database.

After a matching record is found, the method 400 can perform a field-by-field comparison to determine matching records at 425. To assist in determining matching fields, process 425 can provide matching indicators in a matching table. That it, if corresponding fields of records match exactly, an indicator of such exact match can be stored. For example, an "E" (denoting exact match) can be stored corresponding to an applicable field and record in a matching table. As another example, if data fields differ, then this can be indicated by storing an "N" (denoting no match) in an appropriate place in a matching table. And as another example, if data fields vary, a variance indicator can be recorded to indicate a degree of difference. The variance indicator may be used as a multiplier in a two-tier weighted algorithm as discussed below. Typically, a larger data variance in the data yields a larger variance value. For example, for an exact match ("E"), a variance value may be a zero (0), and for no match ("N"), a variance value can be a three ("3"). If a particular field contains multiple entries, each entry of the field can be compared to each entry of a corresponding field in a matching record.

The method 400 can also include applying weights to score loan application data records at 430. More specifically, one or more data fields in one or more data records can be weighted for importance. For example, in some embodiments, data fields of high importance for detecting fraud can be given higher weights relative to other data fields. Fields containing specific identifying information, such as borrower name or SSN can be provided with high weights, or the highest weights. Only fields with weights greater than zero need be compared for records with matching property addresses. Fields can be afforded a zero weight for strategic reasons or because those fields are not likely to indicate fraud. The weights, in combination with the variance between corresponding fields, can determine a relative significance of fraud (e.g., a score denoting potential fraud possibility). A relative significance of fraud can be used to determine a likelihood of fraud and also enable a user to take steps to further investigate. In some embodiments, weights can be implemented with a multiplier value.

As shown in FIG. 4, the method 400 can also include determining a score for a data record at 430. Data records as discussed herein can be loan applications so the method 400 can determine a loan application score indicative of possible fraud associated with a loan application. To determine a score for particular data records, for each data field in a data record matching a first record, a provided weight value can be multiplied by a variance to determine a field score. For example, an "E" value can be afforded a lowest variance value for a particular field, while an "N" value can be afforded a highest variance value for a field. Other variance values may also be utilized. Data field scores can be summed for a corresponding data record to determine a data record score. The method 400 can also include providing one or more fraud scenario based on variance amounts (e.g., determined "N" and "E" results).

Table I below illustrates a triggering index that method 400 can implement as an additional testing feature.

The method 400 can also include similar scoring for additional data records by analyzing additional record matches at 435. As shown, process 435 can determine whether one or more additional records with a same property address, for example, as a first record are found in a database. If so, a set of field-by-field comparisons can occur for each such additional record. After all matching records have been found and compared field-by-field to the first record, the match scores can be summed to determine a total loan score at 440.

The loan score can denote a risk of fraud and also be used to determine a recommended level of due diligence. For example, if a loan score is high (meaning it indicates high risk of fraud), a high level of due diligence can be recommended to a user. In a similar fashion of a loan score is low (meaning it indicates a low risk of fraud), a low level of due diligence can be recommended to a user. In some embodiments, loan scores and due diligence levels can be provided on a numbered range (e.g., 1 to 10, or 1 to 100) and/or with "HIGH," "MEDIUM," or "LOW" labels. In currently preferred embodiments, loan score and due diligence level information can be provided to a user via a web-based interface enabling varying use of color indicators (e.g., red, yellow, green, etc.). In addition, in currently preferred embodiments, such information can be provided for each loan application in a user's loan application pipeline and also summarized based loan score and/or diligence level. Such grouping enables users to focus resources as needed on desired loan application groupings in an efficient manner.

As mentioned above, the method 400 can score loan applications to assist users in detecting mortgage fraud. Based on scoring results, and as shown as 445, the method 400 can also determine an alert status for a one or more data records (or loan applications) in a lenders pipeline. If the loan score is above, below, or consistent with a predetermined threshold or threshold range, the method 400 can flag one or more loan applications to alert one or more users who submitted a loan application. The flags can be alerts can be in the form of emails, text messages, blog entries, or many other communications. Preferably, the flags provide analysis information to users so that users can then determine any potential next steps in detecting any fraud associated with a flagged data record.

Upon issuing possible alerts for flagged data records, the method 400 may continue processing new or additional records at 450. If no such records are located, the method 400 can end or await further instruction. It is currently contemplated that fraud detection method embodiments of the present invention, like method 400, can review numerous data records in very short time frames all while continuing to receive additional, new, and/or updated records. Thus, embodiments of the present invention are contemplated as being dynamic in that record review of raw data continues on numerous records at any one time in addition to records continuously being added or updated with raw data information. Analysis of such raw data in accordance with embodiments of the present invention advantageously enables review of real-time data thereby yielding accurate and timely results to users.

Referring back to FIG. 3, the database operator 120 can compare records 310 for differences, as described above, and can alert subscribers 130 of these differences. The fraud detection system 100 can be configured to be primarily concerned with inconsistencies between loans applications, and can also be configured to report multiple similar applications that are not inconsistent. For example, users might desire to be made aware of loan-shopping. Loan shopping can be suggested by multiple consistent loan applications for the same borrower on the same property. If a user is aware of loan-shopping, then the subscriber can be prepared to make a competitive bid for the borrower's business.

As mentioned above, loan applications having certain fields with consistent data but having certain other fields with inconsistent data can be a fraud warning sign. Fraudulent loan applications typically include different borrower data across multiple loan applications for the same property. For example, and not limitation, records containing the same borrower name but different appraisal values can be deemed inconsistent. The database system 100 can be capable of further analyzing results, but at the least, the system 100 can preferably return reports indicating flagged records. Upon receipt of such flagged records, users 130 should perform due diligence to determine the cause of flagged inconsistencies.

Inconsistencies between records 310 need not be the result of fraud. For example, inconsistencies may arise due to human error, such as typographical errors. If requested loan amounts of a preliminarily matching pair are listed as $1,295,340 on one application and $1,295,430 for another, the subscriber 130 might determine that the inconsistency resulted from a typographical error. Thus, embodiments of the present invention can also be configured to determine a magnitude of difference between inconsistent data. Determining magnitudes of difference for certain data fields can also be indicative of possible fraud. Indeed, a user 130 might perform due diligence to determine whether a magnitude difference above a certain threshold comports with possible signs of fraudulent activity. Indeed, embodiments of the present invention can provide data elements triggering the variance. This enables users to determine if a typographical error or a true misrepresentation is a cause for the variance. For example, if a submitted appraisal amount is $345,700, a first matched loan triggered a variance to display $354,500, and a second match loan displayed $374,500. In this scenario a user can determine that both returned variances could be typographical errors due to transposing of numbers in the returned appraisal amounts.

Even if no typographical error occurred, there may be a plausible, legal explanation for the variance. For example, suppose preliminarily matching records 310 include requested loan amounts of $1,295,340 in one record 310 and $1,900,000 in the other. While this may be the result of fraud, the applications might also have been submitted at different times. The borrower's knowledge with respect to his own funds might have differed greatly between the submission times. A user 130 can be informed of this and then perform due diligence to verify the correct requested loan amount.

In some embodiments of the present invention, users 130 can monitor records over a lifecycle of a loan. For example, the database operator 120 can continue to monitor records with newer received records to continually monitor for possible fraudulent activity. As another example, records 310 can be compared to other records 310 periodically for a predetermined holding period. Indeed, in some embodiments a record 310 can be compared to other records 310 daily for a holding period of approximately 30 to approximately 90 days. Alternatively, additional exemplary holding periods can be 61 days and can range from 1 day to a complete year. Users can modify holding periods per submitted transactions by providing such search query information to the database operator.

Embodiments of the present invention also enable users to modify loan transactions provided in their respective pipelines. As mentioned above, users can submit information they obtain from applicants to a fraud detection system 100. The fraud detection system 100 can be configured to maintain various pipelines of applications segregated by users 130. This advantageously enables users to monitor their borrower-specific applications with an internal pipeline and then applications of other users via an external pipeline. In addition, fraud detection system 100 embodiments of the present invention enable users to modify transactions maintained in their pipelines. For example, as loan transactions near the end of a lifecycle or are completed for other reasons, users can provide this information to the database operator. In doing so, users can modify the number of transactions contained within their pipeline. And in similar fashion, fraud detection system embodiments of the present invention can be configured to provide updated information to users when data in a data record changes or corresponds with another data record maintained in the database. These features of embodiments of the present invention enable users to maintain records in their pipeline as desired and also control how reports are provided to them by the system 100.

In other embodiments, and as discussed in more detail below, a fraud detection system 100 can perform credential checks on those involved in a loan transaction. For example, a database operator 120 can verify that professionals included in originator information hold valid credentials. A credentialed list can be maintained in the database 140 for each subscriber 130. Alternatively, the database operator 120 and/or database 140 can be configured to access one or more external databases to obtain credential information. A credentialed list can include, without limitation, a list of known mortgage brokers and licensing information. Originator information can be compared to one or more credentialed lists for one or more users 130. Additionally or alternatively, originator information can be compared to a system credentialed list, which can be maintained for the benefit of all or a set of the users 130. If originator information fails to match any item of a relevant credentialed list, users 130 can be alerted.

Reporting Potential Fraudulent Activities for Further User Investigation

Figure 5:
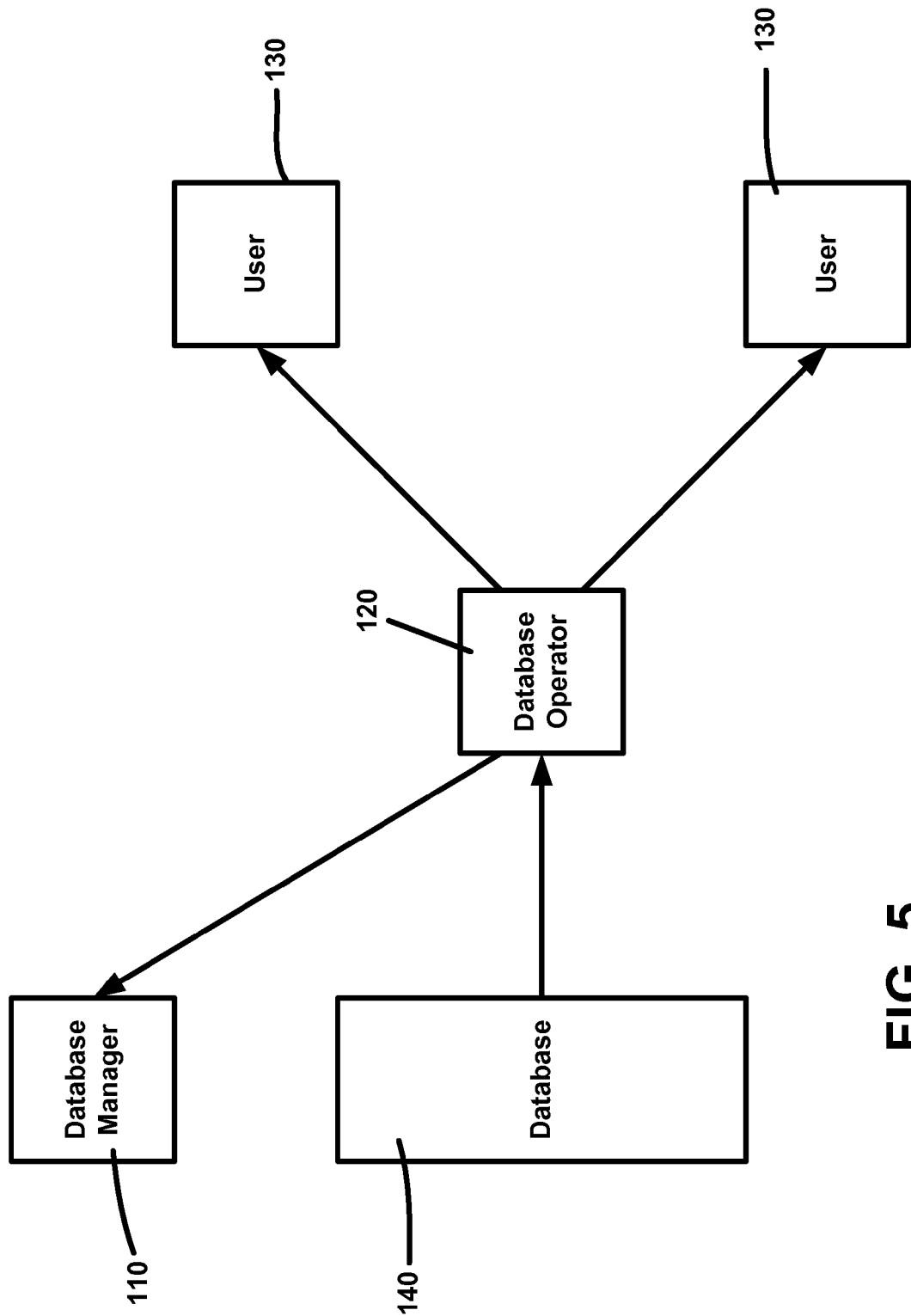
FIG. 5 illustrates an information flow diagram for fraud detection system users according to some embodiments of the present invention.

FIG. 5 illustrates a flow diagram of information from the fraud detection database system 100 to users 130 according to some embodiments of the present invention. The database operator 120 can retrieve data from the database 140, preferably by way of queries to the database 140. The database operator 120 can send reports to the users 130. The database operator 120 can also send reports to the database manager 110, which the manager can use to ensure the database system 100 is running as desired. For example, the database manager 110 can implement administrative checks and processes to ensure that a fraud detection system is operating as desired.

Reports to users 130 can list all or a subset of preliminary matches, and can list all or a subset of flagged matches. Summary reports can highlight inconsistent data of flagged matches. As comparisons can be conducted periodically, a user 130 can receive multiple reports on a single loan application. Each report can be cumulative or, alternatively, each report may list only results of comparisons to new records 310. In addition, a report can include a due diligence level indicating a level of suggested diligence. A report may also include an identification verification score providing a score indicative of whether provided names and biographical information are consistent with various other data records.

Fraud detection system embodiments according to present invention can deliver and/or provide reports in electronic form. For example, reports can be provided in an email format and/or in response to real-time queries. If results are reported via a computer program in which a user 130 logs in to view results, the program can ensure that users 130 have an opportunity to sufficiently view the report. For example and not limitation, results can remain viewable until a user 130 takes an affirmative action, such as closing a window or deleting a report in a web-based interface. Users 130 can choose whether to receive cumulative reports or to receive only new results.

As mentioned above a user 130 can notify the database operator 120 when a loan application is removed from the subscriber's pipeline. If such a notification is made, the database operator 120 can remove the associated record 310 from the database 140 so that no further reports to that user 130 include comparisons with one or more associated records 310. Other users 130, however, may continue to receive notification in their reports of inconsistent information between their applications and the removed loan application. Reports can list results in a particular order based on preferences of the industry or of individual users 130.

The order can be determined based on a two-tier weighted algorithm for each element of borrower information in the records 310. Such an industry-generated algorithm may be derived based on feedback from top lenders and the Mortgage Bankers Association. In a two-tier weighted algorithm, inconsistencies in certain data elements can be more significant than inconsistencies in other data elements in identifying potential fraud. For example, an inconsistency in requested loan amount or appraisal value can be more significant than an inconsistency in current employer address. Also, a borrower's SSN may be a critical data element in determining a valid identity, acquiring credit history, verifying employment and income, etc. Because identity fraud and/or theft generally requires some level of falsification of an SSNs, SSNs can be weighted as a more important data element (e.g., as a first tier weight). Other data elements can be assigned a different weight (e.g., as a second tier weight). In reviewing SSNs, for example, embodiments of the present invention can determine variance severity for each SSN when other loans are found matching the property address of a submitted loan. If a number sequence in the SSN is either transposed (which could be SSN "Tumbling") or different, a weighted multiplier can be assigned depending on a number of found incidents. In some embodiments, weight values can range from zero to thirty, depending on data's importance to a loan transaction.

In some embodiments, it is preferred that significant inconsistencies appear first in results lists of reports. As such the first tier in the weighted algorithm can consider the significance of the inconsistent data elements. The second tier can weigh the magnitude of the inconsistency. For example, a requested loan amount difference of $145,000 and $154,000 is less significant than a requested loan amount difference of $145,000 and $300,000. In some embodiments, when a variance is found for fields assigned a maximum field weight (or a weight above a certain threshold), a high risk alert can be assigned regardless of a total loan score.

A range of due diligence efforts can be undertaken by users 130 based on the type of inconsistencies shown in reports. For example and not limitation, if a user 130 sees multiple loan applications for the same property with different monthly incomes, the user 130 may implement tools to research and verify the true income of the borrower. For another example, if a user 130 sees multiple loan applications for the same property but with different borrower names, the cause could be a typographical error. If this is the case, the user 130 might perform due diligence in verifying the correct spelling of the name.

If a user 130 sees multiple loan applications across different lenders for the same property but with different names, the user 130 might suspect a shot-gunning scheme. In that case, the user 130 might verify the authenticity of the loan application. The database operator 120 can perform preliminary analysis on inconsistent preliminary matches. For example and not limitation, reports to users 130 can categorize inconsistencies to highlight the possibility that certain fraud schemes are underway.

FIGS. 6A-6F illustrate exemplary reports provided by a fraud detection system according to some embodiments of the present invention. The first row 610 of the reports in FIGS. 6A-6F lists headings for the items in the second row 620. The first item of the first row 610 states "Loan ID." Accordingly, the first item in the second row of the first column gives the Loan ID of the primary record 310, the record 310 to which the report refers. The second item of the first row 610 states "Property Address," and the second item of the second row 620 gives the property address on the loan application associated to the primary record. The next item of the first row 610 asks for the Loan ID of the primary record 310, which is given in the second row 620 below. The remaining items ask for Loan IDs of records 310 preliminarily matching the primary record, and the Loan IDs of those records are given below, on the second row 620.

Column 630 lists titles of data elements of the primary record 310. Column 640 lists the corresponding data for the primary record. The remaining columns 650 to the right of column 640 give the inconsistent corresponding data elements for the preliminarily matching records for which Loan IDs are listed in the second row 620.

The database operator 120 can return a preliminary fraud analysis in reports. For example, item 660 gives a possible fraud scheme based on a preliminary analysis of the inconsistencies in the records. For example, a possible fraud scheme can be returned based on the results of a number of IF-THEN-ELSE tests corresponding to known fraud schemes. These tests are based on data fields contained with data records. Such returned fraud schemes can include those discussed above and also those discussed below in more detail (for example, see TABLE I and associated text). Item 670 gives the potential risk that the records referenced in the report represent a fraud scheme. Additionally, as shown only in FIG. 6D, the report can list additional useful information 680, such as non-credentialed and/or sanctioned professionals. So long as report present relevant inconsistencies to subscribers 130, the reports need not take the same format or report the same set of information as those reports illustrated in FIGS. 6A-6F.

In addition to the above, the database operator 120 can produce comprehensive aggregated reports from the database 140 for the database operator's own use or for the database manager 110. For example, comprehensive reports can list a number of mortgage applications processed, the number of different appraisals by a single appraiser, a number of different appraisals for the same property with different appraisers, the number of times a potential shotgun fraud was identified, the number of times a flip fraud scenario was identified, and many other data. Reporting can also be tailored to user's pipeline settings. In this manner, for example, reports can include predetermined formats based on a user's pipeline settings and may only report testing data of a user's pipeline.

Additional Fraud Detection & Reporting Features

Figure 7:
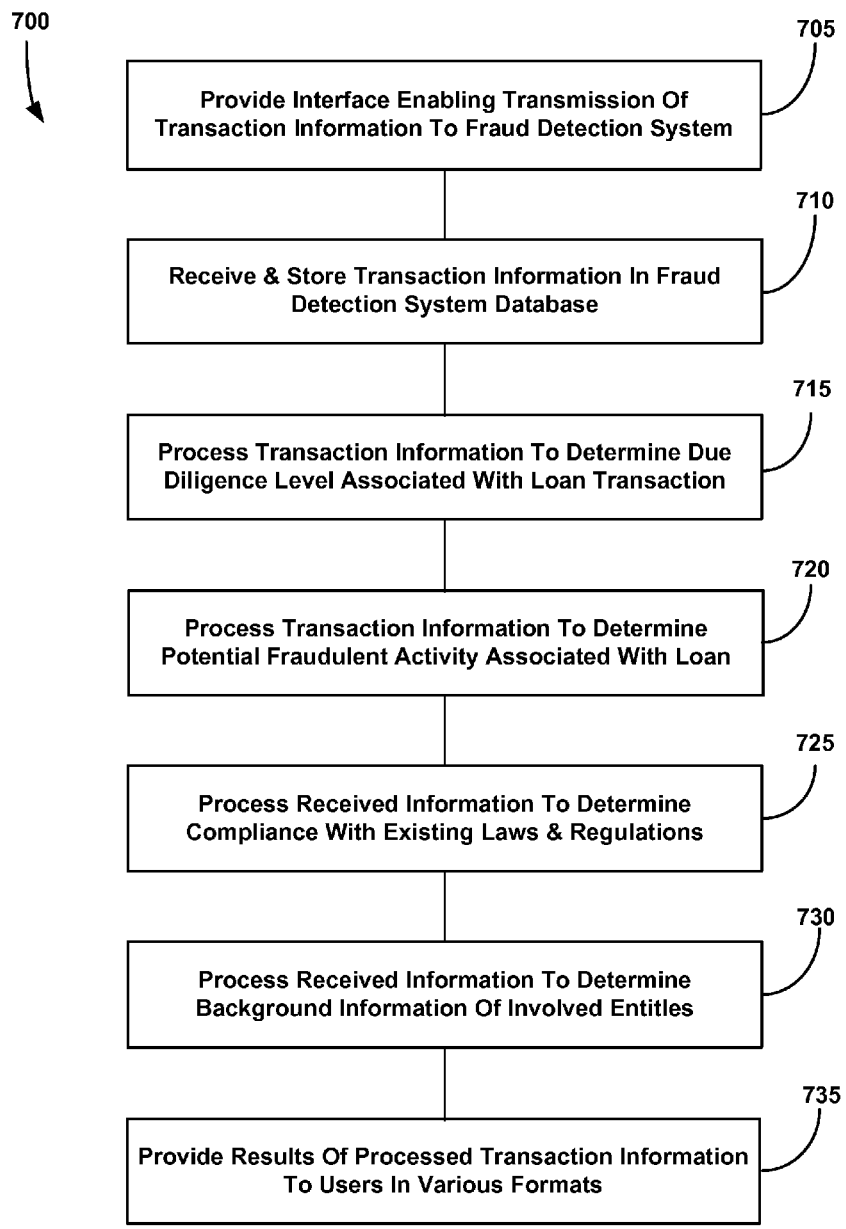
FIG. 7 illustrates a method of fraud detection according to some embodiments of the present invention.

FIG. 7 illustrates a method 700 of fraud detection according to some embodiments of the present invention. Those skilled in the art will understand that method 700 can be performed in various orders (including differently than illustrated in FIG. 7), additional actions can be implemented as part of a method embodiment, and that some actions pictured in FIG. 7 are not necessary. In addition, it should be understood that while certain actions illustrated in FIG. 7 may be discussed herein as including certain other actions, these certain other actions may be carried out in various orders and/or as parts of the other actions depicted in FIG. 7.

The method 700 may initiate in certain embodiments as shown at 705 by providing an interface for receiving data. The data can be transmitted to and received into a database for processing in an effort to detect fraud. The data may include financial transaction information including, mortgage loan information. The data may also include information concerning borrowers, lenders, and/or entities. Data can be submitted by users or data can be obtained by accessing one or more databases that may be publicly or private databases. In some embodiments, the interface can be a web-based interface. Such an interface enables users to submit information (e.g., mortgage loan information) for processing via a web browser. A web-based interface can also enable transmission of information over the internet. In addition, the interface may be provided as a software application capable of submitting data over a private network. Data can be received in various forms including and ranging from receipt of a batch of data records to receipt of a single data record.

At 705, the method 700 can also include receiving and storing data in a fraud detection system database. Data can be stored in various fashions. For example, received data can be stored in various records wherein a single data record corresponds to a single mortgage loan application. Data can also be stored using various key fields to distinguish data records from each other. As an example, data records provided by financial institutions (e.g., lenders in a mortgage transaction) may be stored using a key field identifier to distinguish data records between financial institutions. Such an identifier can be used to implement user pipeline control to one or more users for tracking their own data records.

As shown at 715, the method 700 can also include processing transaction information to determine a due diligence level associated with loan transactions. For example, a fraud detection system can render identity verification results for each primary applicant/borrower on the transaction or the highest risk applicant/borrower on the transaction. Each high risk applicant/borrower can be identified by the system and displayed in the system interface. High risk individuals can then be associated with a high due diligence level indicating that a user should further investigate the applicant/borrower and a respective loan transaction.

As shown at 720, the method 700 may also include processing transaction information to determine potential fraudulent activity associated with loan transactions. For example, a fraud detection system can process loan data transaction information for each borrower, applicant, lender professional, and/or company involved in a transaction. In some currently preferred embodiments, lenders can view information related to their mortgage applications via an internal pipeline analysis and also view information related to other lenders via an external pipeline analysis. Enabling lenders to view loan applications in their respective pipelines relative to loan applications in other lender pipelines advantageously enables lenders to determine if borrowers and/or brokers are applying or have applied to other lending institutions. Such information may be useful and desired by lenders in managing risk associated with mortgage loans.

In addition, a fraud detection system according to embodiments of the present invention can perform data validation checks. For example, a system can process received data to validate information related to the borrower's identity using an identity verification service. Validation can help determine if alternate information can be found associated with the borrower information. Such information can determine if a borrower has various name aliases as well as social security numbers and names. In a currently preferred embodiment, for example, a fraud detection database can cross reference a social security number database to determine if a received name matches the database and also to determine if a received social security number is a valid number (e.g., the social security number is not on a death list).

As shown at 725, the method 700 can include processing information to determine compliance with existing laws and regulations. For example, in a mortgage transaction, lending institutions must comply with federal laws and regulations specific to consumer information and the establishment of relationships with their customers. These regulations are sometimes referred to as "Know Your Customer" regulations. Regulatory requirements associated with USA Patriot Act, Red Flag Rules (effective November 2008), and FACTA regulations require lending institutions to fairly and accurately know who their consumers are when a relationship is established. Such relationships generally include bank account opening, granting of loans, and any other business relationship that can materially affect the institution and/or consumer. Mortgage fraud can often be facilitated by simply stealing a consumer's identity or assuming their identity for the purpose of purchasing property or defrauding a lender for monetary gain. Identity theft is a common fraud incidence reported to local, state and federal agencies. Embodiments of the present invention advantageously enable an integrated utility to perform required compliance checks as well as manage the threat of fraudsters attempting to use false or stolen identities. To accomplish such checks a fraud detection system can access and obtain information from other databases (e.g., the Federal Government's Watch List) and cross check received mortgage loan information with data from these other databases.

As shown at 730, the method 700 can include processing information to determine background information for involved entities. This feature of embodiments of the invention advantageously enables review of loan transaction data related to third parties, industry professionals, and companies facilitating a loan transaction. Indeed, some embodiments can access one or more other databases (e.g., a proprietary and contributory database) that contain containing information related to professional licensing, publicly sourced derogatory incident reports, sanction and administrative action reports, and past or ongoing incidents of alleged fraud and misrepresentation.

As an example, fraud detection systems according to some embodiments can obtain information to verify a professional's credentials and risk associations by directly searching the contributory database for license validation and status, as well as any inclusion in a reported incident directly, or indirectly. After obtaining and analyzing background information for involved entities, the fraud detection system can provide results to users (as discussed below in more detail). For example, the system can return an "OK" or "ALERT" status based on received background information. By obtaining and analyzing background information, embodiments of the present invention can uncovers relationships among transaction parties, identify conflicts in professional credentials, and enable greater visibility to prior adverse business activities or associations that may harm lenders.

As shown at 735, the method 700 can also include providing information processing results to users in various formats. Formats include, but are not limited to, email alerts and web-page listings. Formats can also include various reports provided by email and or return web-page listings. In addition, exemplary report formats can include line item results as a summary of loan transaction data that includes results from the processing, matching, and scoring algorithms. Also, the system can enable a user to select specific fields with toggle functionality to present more detailed information about the loan transaction data and the processing results. The can also enable interactive user functionality to present loan transaction data in configurable formats through filtering, searching, and sorting capabilities. Still yet, the system can display a report with detailed validation, verification, and credentialing processing results related to the borrower/applicant and transaction professionals and/or companies.

Other reporting capabilities include providing a due diligence level associated with a loan transaction and also an identification score. The due diligence level can be based partially on an aggregate view of all data and if certain data inconsistencies appear between reviewed data fields a returned due diligence level can be set to "HIGH RISK" or a "RED ALERT" status. Other due diligence levels can include "LOW RISK" or "MEDIUM RISK levels. Similarly, returned results can include an identification score providing score information indicative of how a borrower's name checked with other checks. For example, if one database contains a name with a different SSN than submitted name, a borrower name identification score may be low indicating that the name issue should be further investigated. In another example, if one or more other database checks are performed and a borrower's name information is consistent among several records a high identification score can be returned indicating that a borrower's name is consistent with other data records.

Fraud Incident Submission Features

Figure 8:
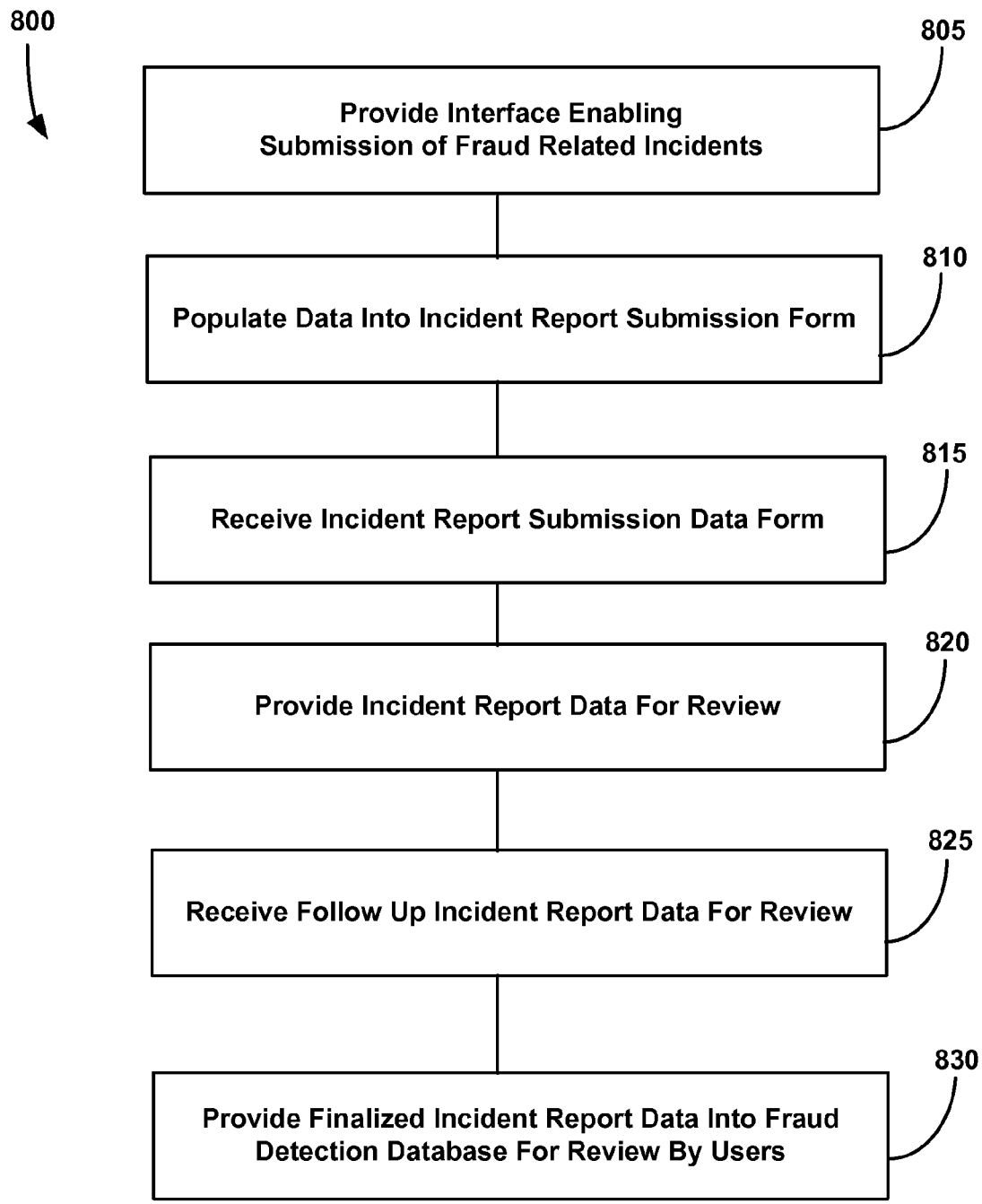
FIG. 8 illustrates a method of an incident submission process according to some fraud detection embodiments of the present invention.

FIG. 8 illustrates a method 800 of an incident submission process according to some fraud detection embodiments of the present invention. Those skilled in the art will understand that method 800 can be performed in various orders (including differently than illustrated in FIG. 8), additional actions can be implemented as part of a method embodiment, and that some actions pictured in FIG. 8 are not necessary. In addition, it should be understood that while certain actions illustrated in FIG. 8 may be discussed herein as including certain other actions, these certain other actions may be carried out in various orders and/or as parts of the other actions depicted in FIG. 8.

The method 800 can initiate at 805 by providing an interface enabling submission of fraud related incidents. Indeed, users of a fraud detection system according to some embodiments of the present invention can submit information related to fraud for further investigation and possible inclusion in the fraud detection system's database. In currently preferred embodiments, the interface can be a web-based browser form capable of accepting user data entry related reporting a fraud related incident. In other embodiments, data forms can be transmitted (e.g., email, FTP, or SFTP) to a fraud detection system for analysis and review.

The method 800 can continue at 810 by populating data into an incident report submission form. Indeed in some embodiments, the system will automatically load data elements from loan transaction data into specified fields. For example, an applicant's name will appear in the corresponding incident submission field. The system also enables interaction with users so that additional information (e.g., from one or more users) can be input into a submission form.

The method 800 can continue at 815 by receiving incident report submission data. Upon receipt, embodiments of a fraud detection system can provide the ability to query multiple databases. This enables users to determine whether those suspected of fraud may have been involved in other reported incidents. For example, the databases include real estate and professional license data directly from the Mortgage Industry Data Exchange ("MIDEX"). MIDEX is a repository containing industry-contributed incidents of fraud and material misrepresentation; publicly sourced information specific to administrative and disciplinary actions and sanctions; and professional license information. As mentioned above, a fraud detection system according to some embodiments enables users to query databases in an effort to verify and adjudicate the professionals of record associated with the incident.

The method 800 can continue at 820 by providing incident report data for review. As an example, some embodiments will provide reported fraud incident information for entry into the MIDEX incident submission processing queue. The system can also associate a reported incident to loan transaction data by using a unique identifier that relates the two entities or the loan transaction data and the incident report. Thus the fraud detection system supports submission of an incident related to loan transactions, transaction parties or information contained in an official suspicious activity report. The review process can include administrative review of the incident information, direct interaction with the submitter, data editing of incident information, formal review and approval of the completed incident report by the submitter and final delivery of the approved incident to a database upload queue for inclusion into the database.

The method 800 can also continue at 825 by receiving follow up information related to a reported incident. For example, the system can support a request for information and challenge of an incident submission. The challenge process enables an industry professional and/or company to request incident information naming the requester. The requester can submit information to an administrator via the system for verification and for potential future interaction regarding the submitted incident. An administrator can query the database for any incident reports associated with the requester. The requester will receive the incident information using an approved delivery method. The requester is given authorization to respond or rebut information contained in the incident. The response or rebuttal is delivered to the incident submitter for review and response. An administrator acts as the intermediary between both parties during the rebuttal process. During the course of the rebuttal process, it may be determined that the incident will remain in tact with no further modifications or the rebuttal will be approved by the incident submitter resulting in the removal of that incident report.

The method 800 can also continue at 830 by providing finalized incident report data into a fraud detection system database for review. For example, the system can support database modifications to the incident report by an administrator. Data modification can include removal of incident text or the addition of a requestor's response to the original incident of record. The system can notify submitting entities with a relationship to the requester as well as other user of interest with incident activity. The system can also notify all entities with an interest in the named professionals of any new incident activity or updates to an existing incident report.

Entity & Credential Verification Features

Figure 9:
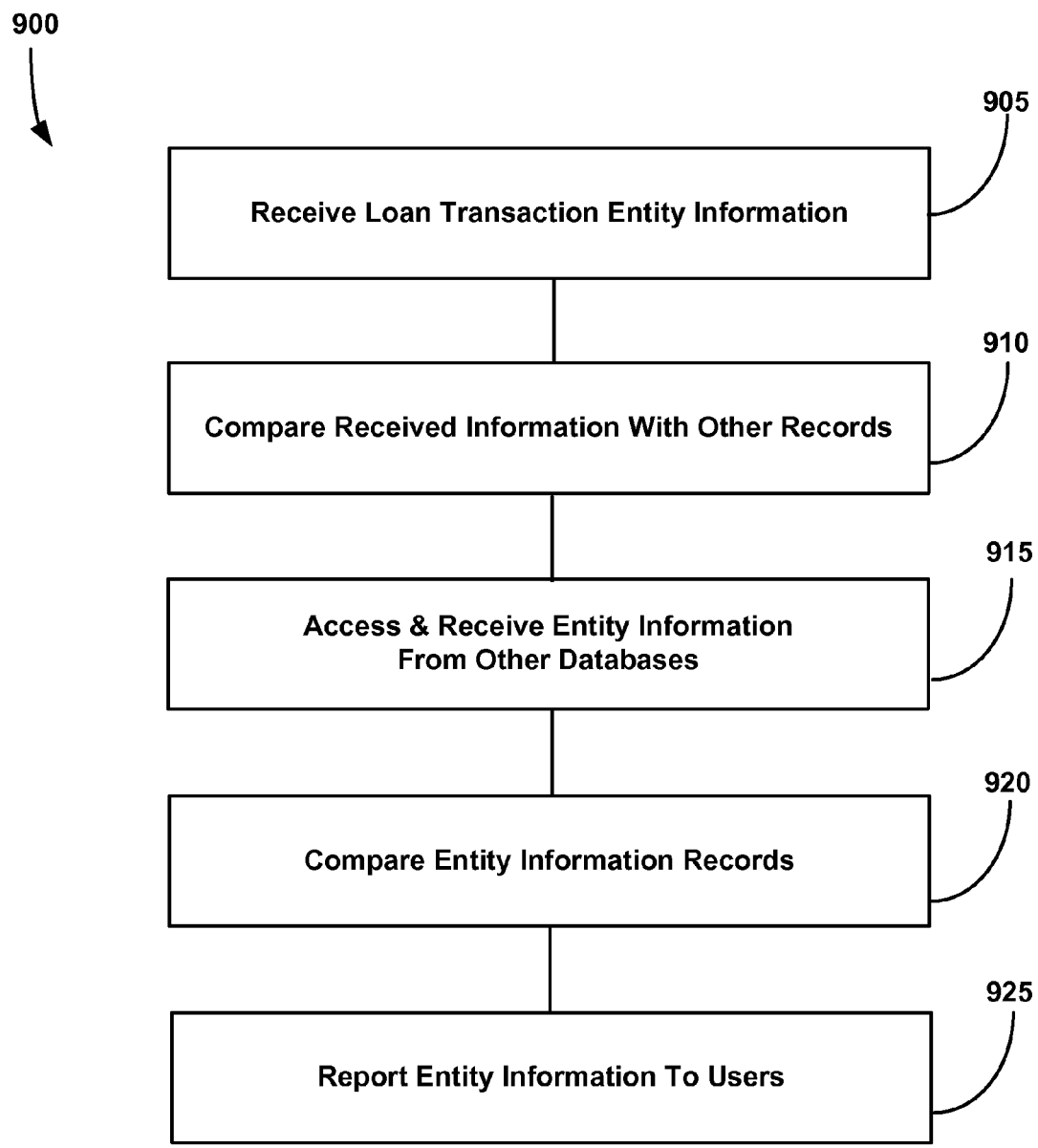
FIG. 9 illustrates a method of authenticating and verifying entities and professionals involved in a financial application process according to some embodiments.

FIG. 9 illustrates a method 900 of authenticating and verifying entities and professionals involved in a financial application process according to some fraud detection embodiments of the present invention. Those skilled in the art will understand that method 900 can be performed in various orders (including differently than illustrated in FIG. 9), additional actions can be implemented as part of a method embodiment, and that some actions pictured in FIG. 9 are not necessary. In addition, it should be understood that while certain actions illustrated in FIG. 9 may be discussed herein as including certain other actions, these certain other actions may be carried out in various orders and/or as parts of the other actions depicted.

As shown, the method 900 can initiate by receiving names of entities involved in a loan transaction. Entities can include people, names of businesses, and companies. People may include borrowers, lenders, brokers, and realtors. By receiving this information, fraud detection systems according to the present invention can perform background and credential checks on the received information. Indeed, at 910, the method 900 may include comparing received information with records already existing in the database. The result of such checks can provide information beneficial to users thereby enabling users to obtain background information on those involved in a loan transaction.

The method 900 can also include obtaining information from other existing databases at 915. These databases can include private and publicly available databases. The existing databases can be managed by third parties and they databases can be located distant from a fraud detection system. The existing databases can, for example, be managed by governmental or industry licensing groups and contain entity licensing and/or sanction information. Such features enable users to query a database for authorized and credentialed professionals when a loan transaction is commenced. In addition, a fraud detection system enabling such entity checking can also facilitate queries to credentialed professionals list owned by the user of the system. In some embodiments, fraud detection systems will upload information about a individual professional, as it is presented to the system user. The system can then engage a workflow of data service calls and return specific information related to, for example, professional license status, incidents, OFAC compliance, criminal background, and a synthetic identity check.

After obtaining entity background information from existing databases, users and/or a fraud detection system can compare the received background information to received loan transaction information to perform background checks at 920.

The method 900 can also include reporting entity information to users at 925. For example, fraud detection system embodiments can be configured to present a return list to users for selection when prompted to input information about a loan transaction professional. The process for professional credentialing may be a workflow of choreographed data services that will perform a series of checks and verifications, resulting in a "PASS/FAIL" score for an entity. For each professional credential, the system may require a minimum amount of data criteria to provide results and to assign a "PASS/FAIL" score to be compiled for the overall score. Embodiments can also include providing a credentialed professional list with access to system detail reports and an exception list that contains professionals and/or companies that have been identified as not credentialed to do business. Additional embodiments can also enable uploads of professionals not credentialed to do business with the system user, by the system user.

Fraud Scheme Analysis & Determination

As mentioned above, embodiments of the present invention can be used to identify a potential fraud scheme. The identification can be determined by analyzing results of data field analysis and comparison. For example, the inventors have discovered that by analyzing matching characteristics of certain data fields (e.g., data fields have data that matches or does not match), one or more potential fraud schemes can be provided to a user. Matching characteristics can also include analyzing the "N" (no match) and "E" (exact match) processes discussed above. The below provided table (TABLE I) provides a series of test scenarios for implementing a fraud scheme analysis process in accordance with some embodiments.

other than the first lender. In addition, a processing module can be configured to associate at least one of a due diligence level and identification score with one or more data records. Also, a processing module can be configured to determine if one or more data records complies with financial laws and regulations. Still yet, a processing module can be configured to maintain one or more data records in an active pipeline for a predetermined amount of time, the one or more data records in the active pipeline being associated with a single lender. And yet another aspect can include providing users informa-

TABLE 1

| | Fraud Scheme | | | | | | |
|---|---|---|---|---|---|---|---|
| Data Fields Analysis | Multiple | Flipping | Shot-Gunning | Double escrow | Churning | Chunking | Straw buyer |
| LOAN_BORROWER.CLN_NAME_LAST | * | N | E | E | E | E | N |
| LOAN_BORROWER.CLN_NAME_FIRST | * | N | E | E | E | E | N |
| LOAN_BORROWER.SSN | * | — | — | — | — | — | E |
| ORIGINATOR_COMPANY | | E | — | E | N | E | E |
| LASTNAME_ORIGINATOR | | E | — | E | N | E | E |
| FIRSTNAME_ORIGINATOR | | E | — | E | N | E | E |
| APPRAISAL_VALUE | | N | — | N | N | N | N |
| LASTNAME_APPRAISER | | E | — | E | E | E | E |
| FIRSTNAME_APPRAISER | | E | — | E | E | E | E |
| APP_DATE | | N | N | N | N | N | N |
| LOAN_SELLER.LASTNAME | * | N | E | N | — | E | E |
| LOAN_SELLER.FIRSTNAME | * | N | E | N | — | E | E |
| CLOSE_DT | | 30 | 30 | 5 | 30 | 5 | 60 |
| Additional cross-field comparisons | | borrower == seller | | borrower == seller | | originator == seller | |

As shown in TABLE I, embodiments of the present invention can be configured to review the results of a matching analysis for various data fields. Based on the analysis, a potential fraud scheme can be provided to a user. For example, if a no match result is returned for loan borrower name, appraisal value, application data, and loan seller name in concert with a match for originator company and name and appraiser name information, this information can indicate a possible flipping fraud scheme. As a result, embodiments of the present invention can return this information to a user so that a user can further investigate. Shot-Gunning, double escrow, churning, chunking, and straw-buyer alerts can be similarly returned to users if a matching analysis is in line with the above table entries. Given the dual pipeline features of the present invention, possible fraud scenarios can be returned for both a user's internal pipeline and also for records external to a user's pipeline.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

For example, embodiments of the present invention can include additional features as described below. For example, a processing module can be configured to separate loan transaction information for review by users into multiple pipelines using an identifier configured to distinguish users. Also, a processing module can be configured to separate loan transaction information into an internal pipeline comprising loan information associated with a first lender and an external pipeline containing loan information associated with lenders tion about one or more data records relating to mortgage applications at predetermined stages of the mortgage applications. Also, in accordance with some embodiments, data records can have a uniform format such that the processing module can compared a data record to another data record to determine consistencies and inconsistencies.

Other aspects of embodiments of the present invention can include additional features as described below. For example, a method can include receiving fraud incident data information and storing such information as a data record. A fraud detection method can also include receiving a query based on one or more data fields and to return data records responsive to the query. Still yet, a processing module can be configured to monitor one or more data records for a predetermined period of time and provide reports detailing any changes in the one or more data records. A processing module can be configured to provide reports comprising information about a mortgage application proximate at least one of a pre-funding application stage, a loan funding stage, an investor servicing stage, and a loan servicing stage.

Embodiments of the present invention can still have other features. For example, some embodiments can be configured to validate the one or more data records to ensure that the one or more data records comprise data based on a predetermined data format. Some embodiments can also be configured to receive updated data pertaining to one or more data records and providing administrative operating reports comprising operational information. Such operational information can include database operational status, user interaction information, user submitted information, and other administrative data functions as desired. As discussed herein, embodiments of the present invention can receive information from unique users, which can comprise lenders, brokers, and borrowers. Embodiments can also include at least one webserver operatively configured to provide data interfaces and/or internet portals for use in communication networks. Also, embodiments of the present invention enable users to customize reports provided to them. For example, a reporting module can be operatively configured to receive report format information from a user and to provide report information to a user based at least partially on the received report format information.

Other aspects of embodiments of the present invention can include additional features as described below. For example, a method can include receiving fraud incident data information and storing such information as a data record. A fraud detection method can also include receiving a query based one or more of data fields and to return data records responsive to the query. Still yet, a processing module can be configured to monitor the one or more data records for a predetermined period of time and provide reports detailing any changes in the one or more data records. A processing module further can also be configured to provide reports comprising information about a mortgage application proximate at least one of a pre-funding application stage, a loan funding stage, an investor servicing stage, and a loan servicing stage.

Embodiments of the present invention can still have other features. For example, some embodiments can be configured to validate the one or more data records to ensure that the one or more data records comprise data based on a predetermined data format. Some embodiments can also be configured to receive updated data pertaining to one or more data records and providing administrative operating reports comprising operational information. Such operational information can include database operational status, user interaction information, user submitted information, and other administrative data functions as desired. As discussed herein, embodiments of the present invention can receive information from unique users, which can comprise lenders, brokers, and borrowers. Embodiments can also include at least one webserver operatively configured to provide data interfaces and/or internet portals for use in communication networks. Also, embodiments of the present invention enable users to customize reports provided to them. For example, a reporting module can be operatively configured to receive report format information from a user and to provide report information to a user based at least partially on the received report information.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

We claim:

1. A fraud detection system to detect fraud in a financial loan application process, the system comprising:

one or more interfaces configured to receive loan application information data from a plurality of unique data sources that comprise a plurality of different lenders, the loan application information data comprising a first plurality of loan application data records originating from a first lender and a second plurality of loan application data records originating from a second lender, wherein the first plurality of loan application data records comprises at least a first loan application data record originating from the first lender;

a database configured to receive the loan application information data from the plurality of unique data sources and to store the loan application information data with an identifier configured to distinguish loan application information data records received from the plurality of unique data sources;

a computer processor configured to populate an internal pipeline for the first lender comprising the first plurality of loan application data records originating from the first lender by using the unique identifier associated with the first lender;

the computer processor further configured to populate an external pipeline for the first lender comprising at least the second plurality of loan application data records originating from the second lender;

the computer processor further configured to compare the first loan application data record to other loan application data records in the first lender's internal pipeline, and further configured to compare the first loan application data record to loan application data records in the first lender's external pipeline; and the computer processor further configured to identify potential fraud in a loan application corresponding to the first loan application data record based on the comparisons between the first loan application data record and the first lender's internal and external pipelines.

2. The fraud detection system of claim 1, the computer processor further configured to determine whether one or more loan application data records contain one or more duplicate data fields as compared to the first data record, and to flag the loan application data records containing the one or more duplicate data fields; and the computer processor further configured to determine if one or more of the flagged loan application data records contain a discrepancy in one or more other data fields as compared to the first loan application.

3. The fraud detection system of claim 2, the computer processor further configured to report at least one of information concerning the loan application information data records containing the one or more duplicate data fields and information concerning the flagged loan application information data records containing discrepant information in the one or more other data fields.

4. The fraud detection system of claim 3, the computer processor further configured to organize information in a report at least partially based on a weight corresponding to the one or more other data fields and a measurement of discrepancy in the one or more other data fields.

5. The fraud detection system of claim 1, the computer processor further configured to place one or more received loan application information data records in an active state for a predetermined holding period and periodically analyze active-state loan application data records relative to loan application data records received after the active-state data records.

6. The fraud detection system of claim 1, wherein the computer processor is configured to determine if one or more of the loan application data records contain substantially similar addresses for a real estate property involved in a loan transaction.

7. The fraud detection system of claim 1, the computer processor further configured to conduct an internal pipeline loan analysis by comparing loan application data records from the first lender to other loan one another and an external loan pipeline analysis by comparing loan application data records from other lenders to one another.

8. The fraud detection system of claim 1, the database further configured to receive the loan application information data at an initial loan application stage of a loan application process.

9. A computer-implemented method to detect potential fraud in a financial credit or loan application process, the fraud detection method comprising:
- storing in a database data comprising a plurality of financial credit or loan applications from a plurality of lenders;
- performing a two-level search through use of a computer processor, the two-level search comprising: identifying a subset of loan applications containing two or more of the loan applications having duplicate data in one or more predetermined data fields; and determining whether the loan applications in the subset of loan applications comprise one or more other fields having discrepant data;
- identifying potential instances of fraud based on the discrepant data; and
- conducting a dual loan pipeline analysis that includes an internal pipeline analysis comprising a comparison of all loan applications from a first lender to one another and an external pipeline analysis comprising a comparison of loan applications from the first lender to loan applications from the plurality of lenders.

10. The fraud detection method of claim 9, wherein identifying a subset of loan applications containing one or more of the loan applications having duplicate data in one or more predetermined data fields comprises determining if the one or more data records contain data fields having duplicate property address information or duplicate borrower information.

11. The fraud detection method of claim 9, further comprising providing reports to a user with data organized based on results of a sorting algorithm providing weights to data fields of the data.

12. The fraud detection method of claim 9, further comprising holding data pertaining to one or more of the loan applications in the database for a predetermined holding period and, with a computer processor, comparing existing loan applications to loan applications received after the existing loan applications at predefined intervals.

13. The fraud detection method of claim 9, further comprising performing the two-level search on the loan applications during an initial loan application stage.

14. The fraud detection method of claim 9, further comprising identifying duplicate data between a first data field of a first loan application and a second data field of a second loan application, wherein the first data field and the second data field represent different elements of a loan application.

15. The fraud detection method of claim 9, the method further comprising determining a type of fraud for the first loan application through an iterative process comprising, for each fraud type of a predetermined plurality of fraud types, determining how closely one or more characteristics of the first loan application meet predetermined criteria corresponding to the fraud type.

16. A computer-readable medium having computer readable instructions stored thereon for execution by a processor to execute a method for identifying potential fraud in a loan application, the method comprising:
- receiving data related to a first loan application originating from a first subscriber;
- receiving data related to a second loan application, the first loan application and the second loan application having a duplicate value in a first data field, and having disparate values in a second data field, wherein the first data field corresponds to one of a plurality of predetermined key data fields;
- configuring a computer processor to compare the first loan application to the second loan application;
- flagging the second loan application based on identification of the duplicate value in the first data field and the disparate values in the second data field;
- inserting the second loan application into a set of flagged loan applications, wherein each of the set of flagged loan applications comprises a duplicate value in a key data field and a disparate value in an other data field, as compared to the first loan application;
- ranking the first loan application among a plurality of loan applications based on a predetermined algorithm, wherein the first loan application is ranked relative to the plurality of loan applications based at least partially on (i) importance of the other data fields having disparate values in the set of flagged loan applications and (ii) a measurement of disparity between the disparate values in the other data fields of the set of flagged loan applications, as compared to the first loan application; and
- reporting the ranked plurality of loan applications to the first subscriber.

17. The computer-readable medium of claim 16, the method further comprising calculating a score for the first loan application, wherein the score is based on results of comparing the first loan application to other loan applications in the set of flagged loan applications.

18. The computer-readable medium of claim 16, wherein the first data field containing the duplicate value comprises property address information, and wherein the first data field is examined to determine if a single property is subject to multiple loan applications.

19. The computer-readable medium of claim 16, the method further comprising repeatedly determining on a predetermined basis whether the first loan application has a data field containing a duplicate value of another data field contained within at least one other received loan application, and whether the received loan applications having the duplicate values as compared to the first loan application have other data fields with disparate data fields as compared to the first loan application.

* * * * *